(12) United States Patent
Callaert et al.

(10) Patent No.: US 7,837,875 B2
(45) Date of Patent: Nov. 23, 2010

(54) FLUID FILTER

(75) Inventors: Wim Callaert, Opwijk (BE); Walter A. Booth, Barnegat, NJ (US)

(73) Assignee: Eaton Corporation, Cleveland, OH (US)

( * ) Notice: Subject to any disclaimer, the term of this patent is extended or adjusted under 35 U.S.C. 154(b) by 1076 days.

(21) Appl. No.: 11/511,682

(22) Filed: Aug. 29, 2006

(65) Prior Publication Data

US 2007/0108117 A1  May 17, 2007

(51) Int. Cl.
  *B01D 29/25*  (2006.01)
  *B01D 29/27*  (2006.01)
  *B01D 29/54*  (2006.01)

(52) U.S. Cl. .................. 210/232; 210/238; 210/315; 210/342; 210/452; 210/455

(58) Field of Classification Search .................. 210/232, 210/315, 342, 452, 455, 238
See application file for complete search history.

(56) References Cited

U.S. PATENT DOCUMENTS

| | | | |
|---|---|---|---|
| 37,216 A | 12/1862 | Bush | |
| 90,015 A | 5/1869 | North et al. | |
| 383,493 A | 5/1888 | Sargent | |
| 410,767 A | 9/1889 | Pierce | |
| 414,240 A | 11/1889 | Norton | |
| 439,645 A | 11/1890 | Floyd | |
| 446,342 A | 2/1891 | Goodacre | |
| 473,224 A | 4/1892 | Hickman | |
| 526,637 A | 9/1894 | Ryan | |
| 528,630 A | 11/1894 | Freise | |
| 575,478 A | 1/1897 | Haefner | |
| 590,968 A | 10/1897 | Davis | |
| 752,693 A | 2/1904 | Loffler | |
| 791,111 A | 5/1905 | DuPont | |
| 863,813 A | 8/1907 | Tyler et al. | |
| 918,897 A | 4/1909 | Noe | |
| 948,082 A | 2/1910 | Wickwire | |
| 972,281 A | 10/1910 | Stamets | |
| 975,095 A | 11/1910 | Winans | |
| 976,108 A | 11/1910 | Weiler | |
| 989,752 A | 4/1911 | Ansley | |
| 1,000,405 A | 8/1911 | Healy | |
| 1,187,416 A | 6/1916 | Chase | |
| 1,225,993 A | 5/1917 | Mullaney | |
| 1,363,753 A | 12/1920 | Quinn | |
| 1,430,950 A | 10/1922 | Crandall | |

(Continued)

FOREIGN PATENT DOCUMENTS

AU  113593  6/1940

(Continued)

OTHER PUBLICATIONS

European Search Report issued in connection with European Patent Application No. 06017923.1, Mar. 5, 2007.

(Continued)

*Primary Examiner*—Thomas M Lithgow
(74) *Attorney, Agent, or Firm*—Greenberg Traurig, LLP

(57) ABSTRACT

A filter element includes outer and inner sleeves made from a flexible, pervious material. The inner sleeve, which is arranged substantially concentric with respect to the outer sleeve, employs one or more handles to facilitate the removal of the filter element from an associated filter housing.

20 Claims, 15 Drawing Sheets

U.S. PATENT DOCUMENTS

| | | |
|---|---|---|
| 1,633,818 A | 6/1927 | Kogstrom |
| 1,647,799 A | 11/1927 | Hammer |
| 1,690,630 A | 11/1928 | Fleming |
| 1,754,320 A | 4/1930 | Hopkins |
| 1,761,257 A | 6/1930 | Fleming |
| 1,840,153 A | 1/1932 | Ball |
| 1,847,352 A | 3/1932 | McClatchie |
| 2,014,298 A | 9/1935 | Schneible |
| 2,044,827 A | 6/1936 | Adams |
| 2,069,703 A | 2/1937 | Fisker |
| 2,091,137 A | 8/1937 | Carson |
| 2,100,374 A | 11/1937 | Biever |
| 2,183,877 A | 12/1939 | Wilkinson et al. |
| 2,284,416 A | 5/1942 | Gordon |
| 2,301,120 A | 11/1942 | Kamrath |
| 2,331,332 A | 10/1943 | Latta |
| 2,382,278 A | 8/1945 | Widmann |
| 2,387,368 A | 10/1945 | Vokes |
| 2,405,838 A | 8/1946 | Lawson et al. |
| 2,491,796 A | 12/1949 | Baume |
| 2,521,107 A | 9/1950 | Wiley |
| 2,591,382 A | 4/1952 | Smith |
| 2,638,228 A | 5/1953 | Downey et al. |
| 2,652,902 A | 9/1953 | Sheahan |
| 2,721,624 A | 10/1955 | Osborn |
| 2,750,042 A | 6/1956 | Wilkinson |
| 2,771,151 A | 11/1956 | Osborn |
| 2,792,118 A | 5/1957 | Kraissl |
| 2,855,103 A | 10/1958 | Wilkinson |
| 2,926,787 A | 3/1960 | Combest |
| 3,029,951 A | 4/1962 | Cannon |
| 3,045,826 A | 7/1962 | Howard et al. |
| 3,050,189 A | 8/1962 | Williams |
| 3,053,391 A | 9/1962 | Nelson |
| 3,211,292 A | 10/1965 | Bull |
| 3,249,228 A | 5/1966 | Arvanitakis |
| 3,261,468 A | 7/1966 | Dick |
| 3,262,563 A | 7/1966 | Pall |
| 3,262,572 A | 7/1966 | Cook |
| 3,280,982 A | 10/1966 | Barto |
| 3,347,386 A | 10/1967 | Kraissl |
| 3,347,390 A | 10/1967 | Tietz et al. |
| 3,348,689 A | 10/1967 | Kraissl |
| 3,370,708 A | 2/1968 | Hultgren et al. |
| 3,370,711 A | 2/1968 | Hitzelberger et al. |
| 3,420,377 A | 1/1969 | Vandersip |
| 3,593,854 A | 7/1971 | Swank |
| 3,653,189 A | 4/1972 | Miyake et al. |
| 3,672,506 A | 6/1972 | Syrjanen |
| 3,698,562 A | 10/1972 | Farrow et al. |
| 3,767,054 A | 10/1973 | Farrow et al. |
| 3,770,129 A | 11/1973 | Brumfield et al. |
| 3,771,664 A | 11/1973 | Schrink et al. |
| 3,811,659 A | 5/1974 | Taylor et al. |
| 3,813,334 A | 5/1974 | Bray |
| 3,814,261 A | 6/1974 | Morgan |
| 3,826,066 A | 7/1974 | Higgins |
| 3,859,065 A | 1/1975 | Schoeck |
| 3,890,290 A | 6/1975 | McCabe |
| 3,898,067 A | 8/1975 | Genton |
| 3,931,015 A | 1/1976 | Jenkins |
| 3,942,963 A | 3/1976 | Tevis |
| 3,988,244 A | 10/1976 | Brooks |
| RE29,447 E | 10/1977 | Farrow et al. |
| 4,081,379 A | 3/1978 | Smith |
| 4,157,965 A | 6/1979 | Raible |
| 4,166,793 A | 9/1979 | Turetsky |
| 4,193,780 A | 3/1980 | Cotton, Jr. et al. |
| 4,220,459 A | 9/1980 | Hammond et al. |
| 4,253,959 A | 3/1981 | Tafara |
| 4,285,814 A | 8/1981 | Morgan |
| 4,317,727 A | 3/1982 | Meissner |
| 4,342,574 A | 8/1982 | Fetzer |
| 4,386,948 A | 6/1983 | Choksi et al. |
| 4,388,191 A | 6/1983 | Morgan |
| 4,390,425 A | 6/1983 | Tafara et al. |
| 4,427,110 A | 1/1984 | Shaw |
| 4,467,494 A | 8/1984 | Jones |
| 4,490,253 A | 12/1984 | Tafara |
| 4,496,459 A | 1/1985 | Rosaen |
| 4,537,681 A | 8/1985 | Argiropoulos et al. |
| 4,552,661 A | 11/1985 | Morgan |
| 4,574,047 A | 3/1986 | Rosaen |
| 4,576,799 A | 3/1986 | Worner et al. |
| 4,609,465 A | 9/1986 | Miller |
| 4,632,682 A | 12/1986 | Erdmannsdorfer |
| 4,669,167 A | 6/1987 | Asterlin |
| 4,671,875 A | 6/1987 | Stookey |
| 4,721,563 A | 1/1988 | Rosaen |
| 4,749,485 A | 6/1988 | DeGraffenreid |
| 4,769,052 A | 9/1988 | Kowalski |
| 4,812,235 A | 3/1989 | Seleman et al. |
| 4,842,739 A | 6/1989 | Tang |
| 4,877,526 A | 10/1989 | Johnson et al. |
| 4,885,089 A | 12/1989 | Hankammer |
| 4,918,017 A | 4/1990 | Greenstreet et al. |
| 4,948,398 A | 8/1990 | Thomaides et al. |
| 4,956,089 A | 9/1990 | Hurst |
| 4,963,258 A | 10/1990 | Yagishita |
| 5,039,410 A | 8/1991 | Gershenson |
| 5,045,098 A | 9/1991 | Poor |
| 5,045,194 A | 9/1991 | Gershenson |
| 5,075,004 A * | 12/1991 | Gershenson et al. ........ 210/445 |
| 5,102,545 A | 4/1992 | Hoffmann |
| 5,137,632 A | 8/1992 | Morgan |
| 5,152,890 A | 10/1992 | Linnersten |
| 5,188,731 A * | 2/1993 | Lapoint, Jr. ................. 210/232 |
| 5,243,632 A | 9/1993 | Badin et al. |
| 5,269,919 A | 12/1993 | von Medlin |
| 5,312,544 A | 5/1994 | Kinney |
| 5,322,534 A | 6/1994 | Kaiser |
| 5,336,405 A | 8/1994 | Tang et al. |
| 5,358,638 A | 10/1994 | Gershenson |
| 5,417,855 A | 5/1995 | Gershenson |
| 5,431,706 A | 7/1995 | Paas |
| 5,441,650 A * | 8/1995 | Kirsgalvis ................... 210/767 |
| 5,449,459 A | 9/1995 | Glaser et al. |
| 5,454,945 A | 10/1995 | Spearman |
| 5,484,529 A | 1/1996 | Malugade et al. |
| 5,501,792 A | 3/1996 | Carroll |
| 5,549,724 A | 8/1996 | Mochida |
| 5,573,666 A | 11/1996 | Korin |
| 5,611,925 A | 3/1997 | Yasue et al. |
| 5,624,559 A | 4/1997 | Levin |
| 5,645,721 A | 7/1997 | Carroll |
| 5,679,248 A | 10/1997 | Blaney |
| 5,705,004 A | 1/1998 | Watanabe |
| 5,755,962 A | 5/1998 | Gershenson et al. |
| 5,771,707 A | 6/1998 | Lagaceet et al. |
| 5,814,117 A | 9/1998 | Mochida |
| 5,878,590 A | 3/1999 | Kadle et al. |
| 5,897,787 A | 4/1999 | Keller |
| 5,910,247 A | 6/1999 | Outterside |
| 5,972,059 A | 10/1999 | Morgan |
| 6,030,531 A | 2/2000 | Gershenson |
| 6,136,192 A | 10/2000 | Booth et al. |
| 6,156,198 A | 12/2000 | Bartels |
| 6,238,560 B1 | 5/2001 | Gershenson |
| 6,322,697 B1 | 11/2001 | Hacker et al. |
| 6,342,084 B1 | 1/2002 | Pezzaniti |
| 6,360,896 B1 | 3/2002 | Schildmann |
| 6,361,690 B1 | 3/2002 | Bourgeois |
| 6,409,919 B1 | 6/2002 | Tara |
| 6,497,675 B1 | 12/2002 | Davankov |

| | | | |
|---|---|---|---|
| 6,511,598 B2 | 1/2003 | Gershenson | |
| 6,585,892 B2 | 7/2003 | Gershenson | |
| 6,585,893 B2 | 7/2003 | Gershenson | |
| 6,685,843 B2 | 2/2004 | Leaverton | |
| 6,706,198 B2 | 3/2004 | Gershenson | |
| 6,712,967 B2 | 3/2004 | Gershenson | |
| 7,001,517 B2 | 2/2006 | Gershenson | |
| 7,011,754 B2 | 3/2006 | Chang | |
| 2002/0056680 A1 | 5/2002 | Bourgeois | |
| 2002/0100724 A1 | 8/2002 | Bourgeois | |
| 2003/0029813 A1 | 2/2003 | Gershenson | |
| 2003/0038090 A1 | 2/2003 | Gershenson | |
| 2003/0038091 A1 | 2/2003 | Gershenson | |
| 2003/0038092 A1 | 2/2003 | Gershenson | |
| 2003/0038093 A1 | 2/2003 | Gershenson | |
| 2003/0234215 A1 | 12/2003 | Chang | |
| 2004/0060856 A1 | 4/2004 | Weigeldt et al. | |
| 2004/0124129 A1 | 7/2004 | Booth | |

FOREIGN PATENT DOCUMENTS

| | | | |
|---|---|---|---|
| BR | PI 0209826-1 A | 6/2004 | |
| CA | 2393421 A1 | 6/2001 | |
| CN | 1511061 A | 7/2004 | |
| CN | 1281293 C | 10/2006 | |
| DE | 69110657 T2 | 10/1990 | |
| DE | 69519511 T2 | 2/1994 | |
| DE | 69916139 T2 | 2/2005 | |
| EP | 0071961 A2 | 2/1983 | |
| EP | 0 635 295 A2 | 1/1995 | |
| EP | 0506939 B1 | 6/1995 | |
| EP | 1 222 011 A1 | 12/1999 | |
| EP | 744985 B1 | 11/2000 | |
| EP | 0863787 B1 | 8/2002 | |
| EP | 1 401 556 | 11/2002 | |
| EP | 1222011 B1 | 3/2004 | |
| GB | 473224 | 10/1937 | |
| JP | 2004503353 T | 2/2004 | |
| JP | 2004532114 T | 10/2004 | |
| WO | WO 92/06761 A1 | 4/1992 | |
| WO | WO 95/05881 A1 | 3/1995 | |
| WO | WO 95/21679 A1 | 8/1995 | |
| WO | WO 98/23355 A1 | 6/1998 | |
| WO | WO 01/39858 A1 | 6/2001 | |
| WO | WO 01/94864 A1 | 12/2001 | |
| WO | WO 02/094414 A1 | 11/2002 | |
| WO | WO 2004/060537 A2 | 7/2004 | |

OTHER PUBLICATIONS

International Search Report dated Apr. 25, 2005, issued in International Patent Application No. PCT/US 2003/041482.

International Preliminary Examination Report dated May 17, 2005, issued in International PCT/US 2003/041482.

First Office Action issued on Dec. 11, 2009 in connection with Chinese Patent Application No. 200610121995.2.

Loftex "System 10" Sleeve Filter Bag Brochure, Loeffler Filter-Technik GmbH, dated unknown, and English language translation of same.

Hayward Filter Bags Brochure, Hayward Filtration, LLC, date unknown, p. 25.

* cited by examiner

US 7,837,875 B2

FLUID FILTER

CROSS-REFERENCE TO RELATED APPLICATION

This application claims the benefit of U.S. Provisional Patent Application No. 60/713,133 filed Aug. 31, 2005, the disclosure of which is incorporated herein by reference in its entirety.

FIELD OF THE INVENTION

The present invention relates to fluid filters and, more particularly, to an industrial fluid filter adapted for use in removing particulate matter (e.g., dirt, oil, sludge, etc.) from a fluid.

BACKGROUND OF THE INVENTION

Various types of industrial fluid filters have been developed in the past. For instance, one common type of fluid filter includes a vessel with an inlet for receiving fluid to be filtered and an outlet for discharging filtered fluid from the vessel. The fluid filter also includes a substantially flexible filter sleeve and a perforated metal basket for supporting the flexible filter sleeve against the pressure of fluid flow. In operation, fluid is directed into the interior of the filter sleeve from the inlet of the vessel. After passing through the filter sleeve and the basket, the fluid is discharged from the vessel through the outlet. The filtered-out particulate matter remains in the filter sleeve, which can be removed from the basket for cleaning and/or replacement.

The overall filtration capacity of fluid filters can be increased by providing them with a multi-component filter sleeve or multiple filter sleeves or bags. For example, Gershenson U.S. Pat. No. 6,030,531 discloses a filter bag insert having concentrically arranged inner and outer filter sleeves. The upper ends of the two filter sleeves are attached to each other via a single (i.e., common) cap. A perforated metal basket is provided for supporting the inner and outer filter sleeves against the pressure of fluid passing therethrough.

The filter bag insert disclosed in the Gershenson '531 patent suffers from various problems and disadvantages. For instance, as fluid passes through the inner and outer filter sleeves during a filtering operation, portions of the sleeves become lodged in the perforations of the basket, thereby causing the sleeves to "stick" to the basket. Because the inner and outer filter sleeves are attached to a single cap, they move simultaneously when the cap is lifted to remove the filter sleeves from the basket. In such circumstances, if both of the filter sleeves "stick" to the basket due to the pressure of fluid passing therethrough, a relatively large lifting force would have to be applied to the cap in order to dislodge the sleeves from the basket.

Rosaen U.S. Pat. No. 4,496,459 discloses a filter device which is equipped with a pair of concentric filter bag segments. While the filter bag segments are independently supported by way of separate rings, there is no disclosure in the Rosaen '459 patent of a mechanism for quickly and efficiently removing the filter bag segments from an associated filter basket.

SUMMARY OF THE INVENTION

The present invention overcomes the disadvantages and shortcomings discussed above by providing a filter element, which includes outer and inner sleeves made from a flexible, pervious material. The inner sleeve is arranged substantially concentric with respect to the outer sleeve. An open upper end of the outer sleeve is detached from a closed upper end of the inner sleeve. An attaching mechanism, such as a cap, is provided for attaching lower ends of the inner and outer sleeves to each other. A removal mechanism is provided for facilitating the removal of the filter element from an associated filter housing. The removal mechanism can include at least one handle, which is attached to the inner sleeve.

BRIEF DESCRIPTION OF THE DRAWINGS

For a more complete understanding of the present invention, reference is made to the following detailed description of various exemplary embodiments thereof considered in conjunction with the accompanying drawings, in which.

DETAILED DESCRIPTION OF THE EXEMPLARY EMBODIMENTS

Figure 1:
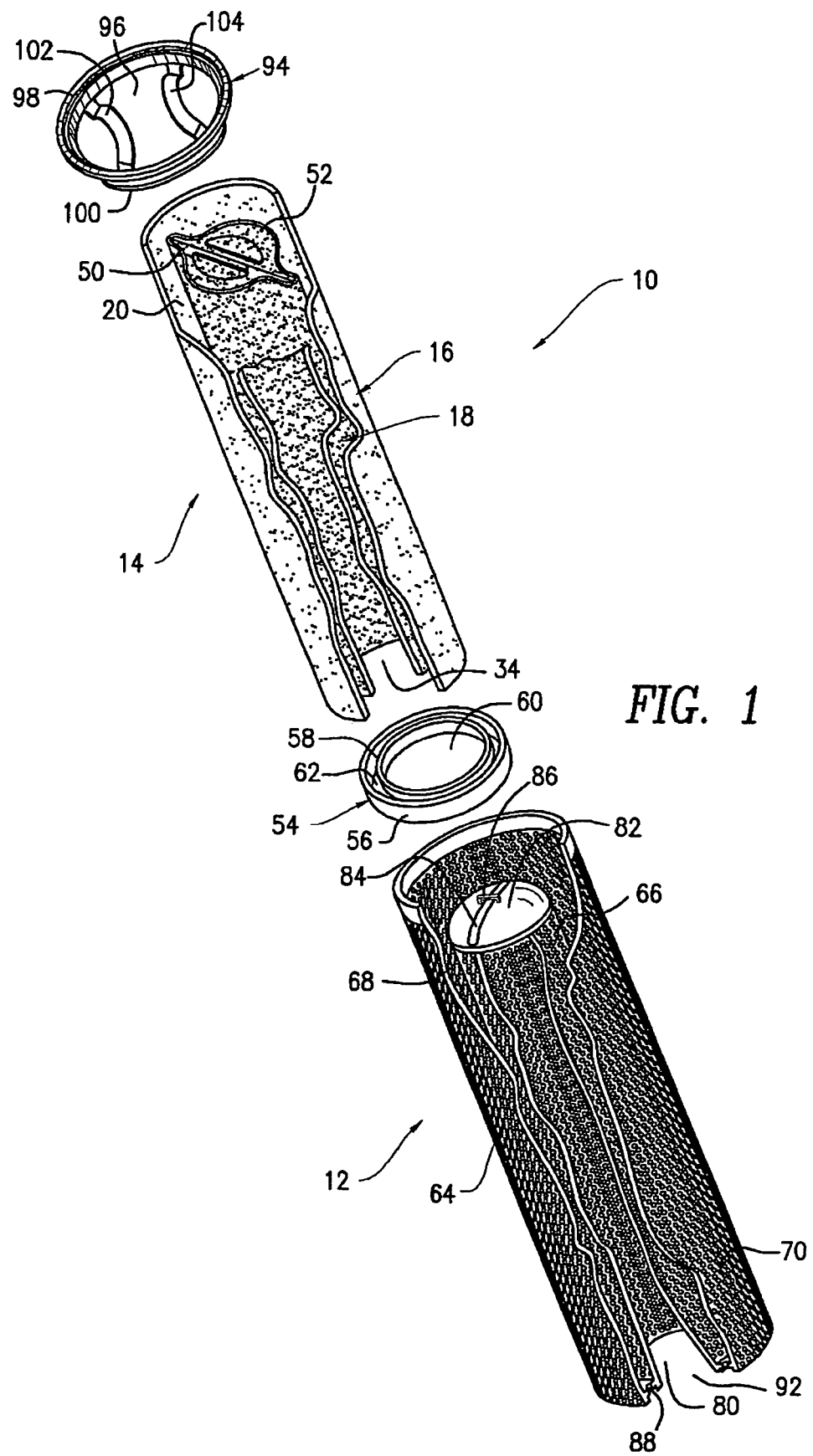
FIG. 1 is an exploded perspective view of a filter assembly including a porous filter sleeve and a perforated restrainer basket, both of which are constructed in accordance with a first exemplary embodiment of the present invention. Portions of the filter sleeve and the restrainer basket have been broken away to facilitate consideration and discussion.
Figure 2:
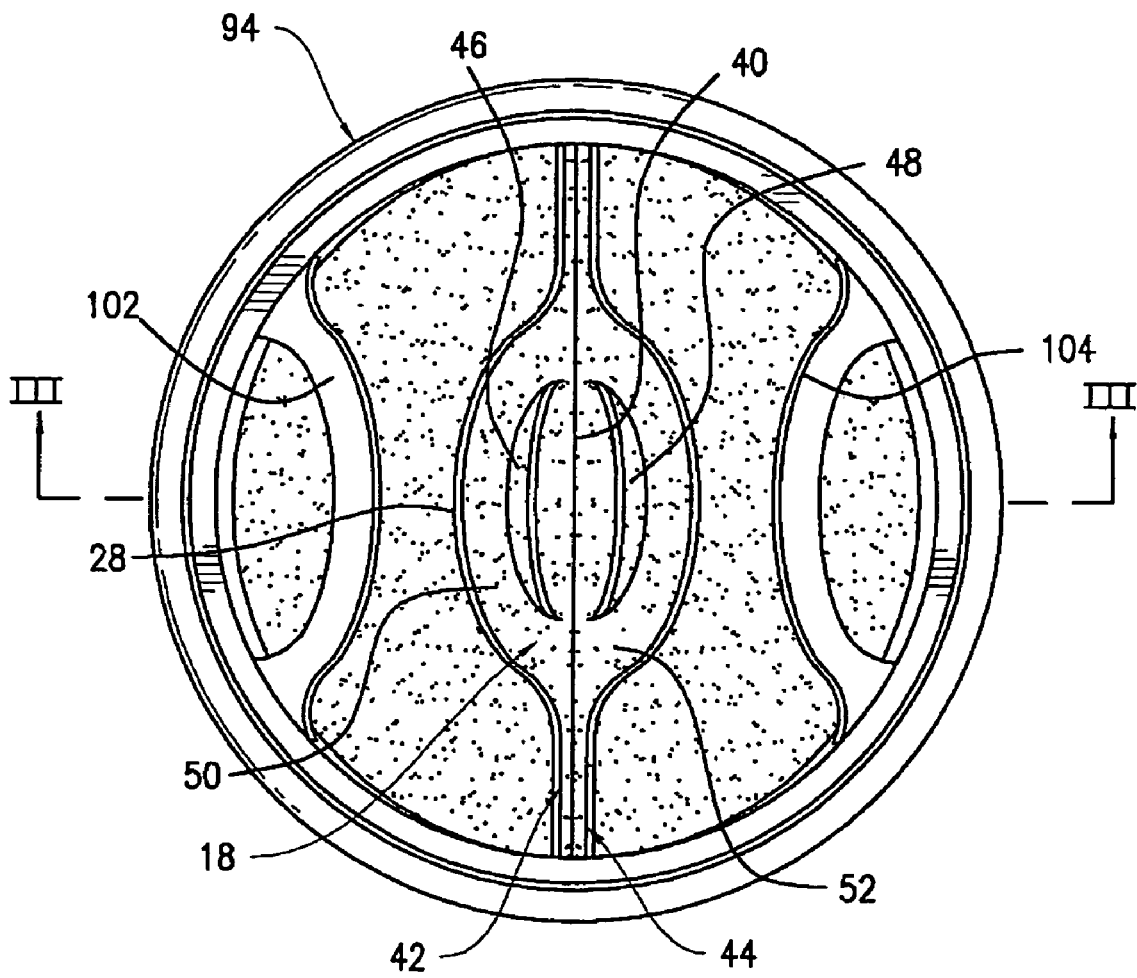
FIG. 2 is a top plan view of the filter assembly shown in FIG. 1.

The present invention can be used in connection with a conventional filter vessel that includes an inlet for receiving fluid to be filtered and an outlet for discharging filtered fluid from the vessel. Examples of suitable filter vessels are disclosed in U.S. Pat. Nos. 5,075,004 and 5,624,559. The disclosures of U.S. Pat. Nos. 5,075,004 and 5,624,559 are incorporated herein by reference in their entirety.

FIGS. 1-3 and 5 illustrate a filter assembly 10 constructed in accordance with a first embodiment of the present invention. The filter assembly 10 is sized and shaped so as to be positioned in a filter vessel V (shown in phantom in FIG. 3), which may be constructed in accordance with the teachings of the two patents incorporated by reference hereinabove. The filter assembly 10 is adapted for removing particulate matter (e.g., dirt, oil, sludge, etc.) from a fluid stream, such as a liquid or gas stream, passing through the filter assembly 10.

Referring to FIGS. 1-3 and 5, the filter assembly 10 is equipped with a restrainer basket 12 (see FIGS. 1, 3, and 5) and a filter element 14 (see FIGS. 1-3) sized and shaped so as to be received in the restrainer basket 12. The filter element 14 includes a cylindrical, elongated, outer filter sleeve (or filter member/bag) 16 and a cylindrical, elongated, inner filter sleeve (or filter member/bag) 18 which is arranged substantially concentrically relative to the outer filter sleeve 16. In other words, the outer filter sleeve 16 has a diameter which is greater than the diameter of the inner filter sleeve 18. As a result of their generally coaxial arrangement, the outer filter sleeve 16 and the inner filter sleeve 18 cooperate to form an annular space 20 therebetween. The outer and inner filter sleeves 16, 18 have filtering walls 22, 24, respectively (see FIG. 3). Each of the filtering walls 22, 24 of the outer and inner filter sleeves 16, 18, respectively, is made from suitable filtering media (e.g., polypropylene, polyester, etc.) which permits the passage of fluid while inhibiting the passage of undesired particulate matter contained in the fluid. As a result, particulate matter contained in the fluid tends to collect on the filtering walls 22, 24 of the outer and inner filter sleeves 16, 18, respectively.

Figure 3:
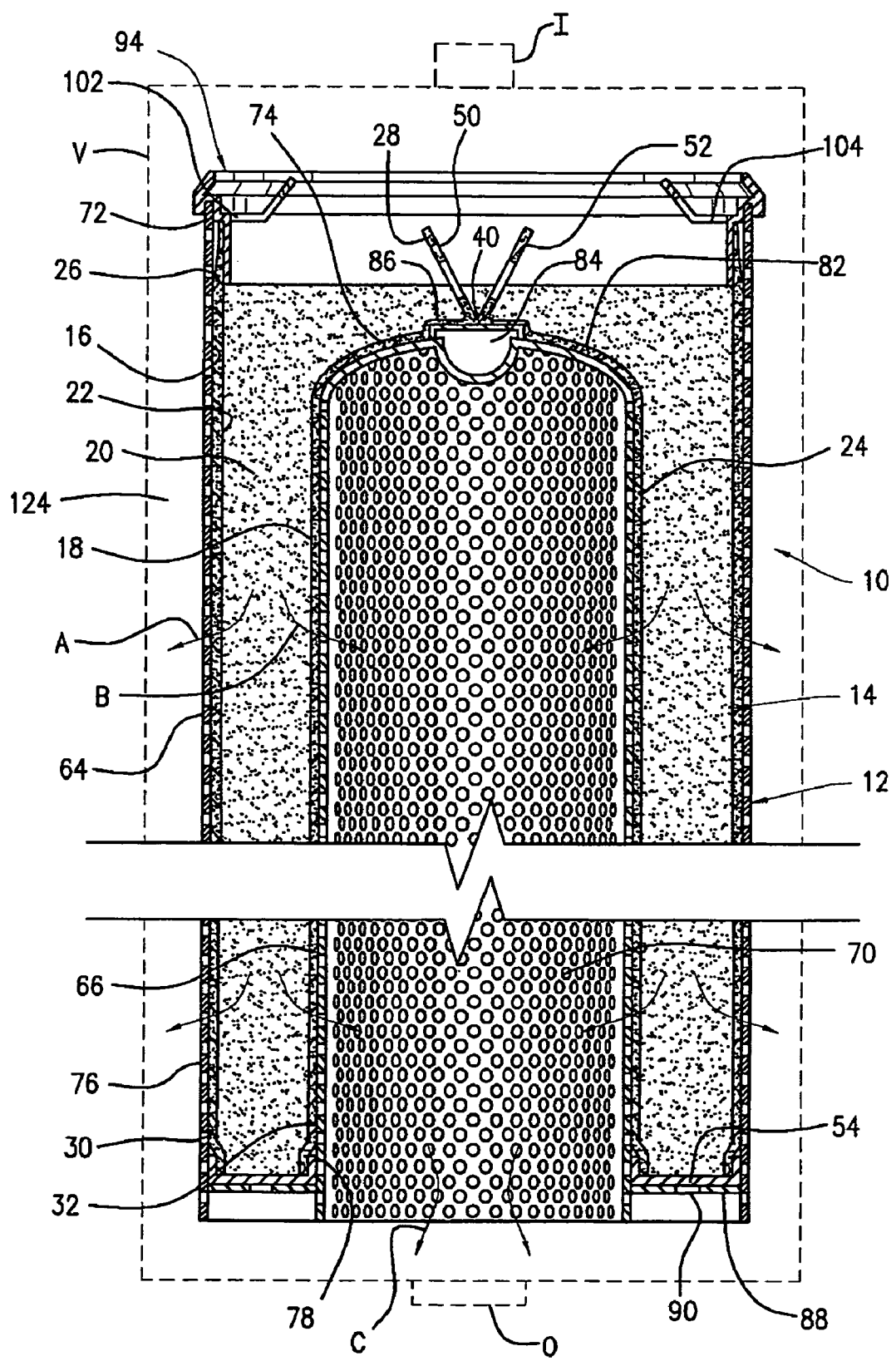
FIG. 3 is a partial cross-sectional view, taken along section line III-III and looking in the direction of the arrows, of the filter assembly shown in FIG. 2, with an associated filter vessel being schematically depicted in phantom.

The outer and inner filter sleeves 16, 18 also have upper ends 26, 28, respectively, and lower ends 30, 32, respectively (see FIG. 3). The upper end 26 of the outer filter sleeve 16 is detached from the upper end 28 of the inner filter sleeve 18, while the lower end 30 of the outer filter sleeve 16 is attached to the lower end 32 of the inner filter sleeve 18. An interior hollow 34 (see FIG. 1) is formed within the inner filter sleeve 18.

Figure 4A:
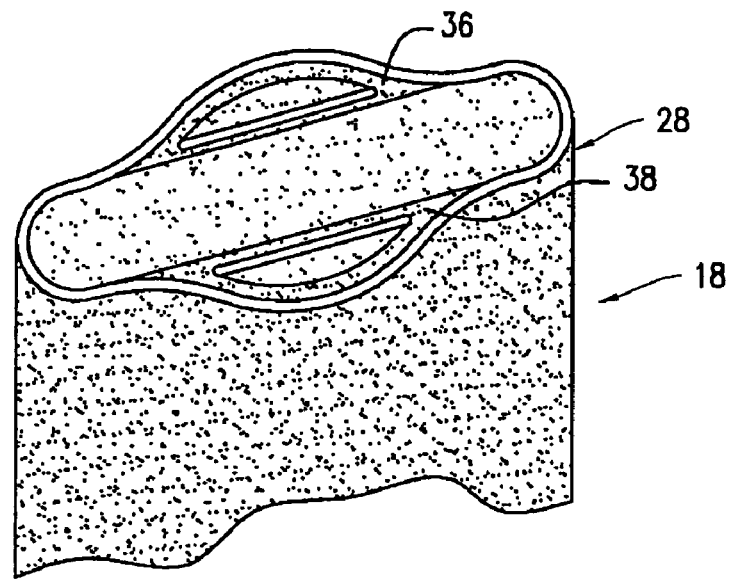
FIGS. 4A-C are sequential schematic illustrations which show the formation of an upper end of the filter sleeve shown in FIGS. 1-3.
Figure 4B:
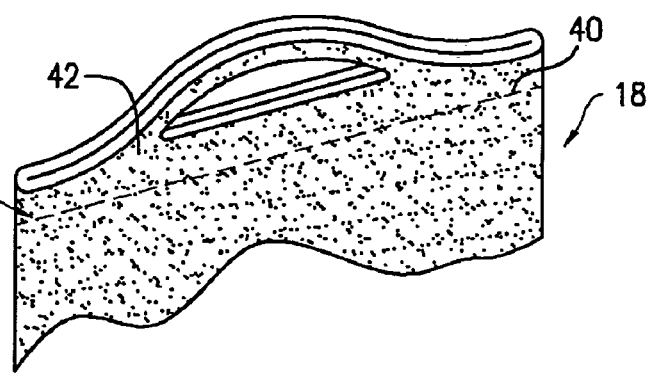
Figure 4C:
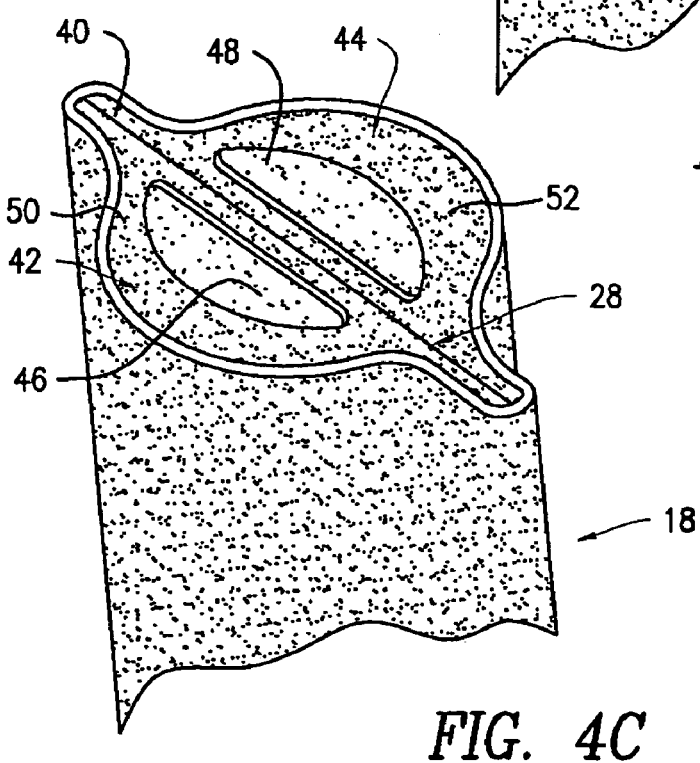

With reference to FIGS. 4A-C, the upper end 28 of the inner filter sleeve 18 is formed by placing its opposing, open edges 36, 38 (see FIG. 4A) adjacent to each other. A seam 40 (see FIGS. 4B and 4C) is then formed below and adjacent to the upper end 28 of the inner filter sleeve 18 by ultrasonic welding to thereby close off an upper end of the interior hollow 34 (see FIG. 1). Alternatively, the seam 40 can be formed using other attachment mechanisms known in the art, such as stitching. A left portion 42 and a right portion 44 extend upwardly from the seam 40. Slits 46, 48 are formed in the left and right portions 42, 44, respectively. In this manner, the left and right portions 42, 44 can function as handles 50, 52, respectively, for purposes to be discussed in greater detail hereinafter.

Referring now to FIGS. 1 and 3, the filter element 14 includes an end cap 54 secured to the outer and inner filter sleeves 16, 18. As shown in FIG. 1, the end cap 54 includes an outer annular wall 56, which is attached to the lower end 30 (see FIG. 3) of the outer filter sleeve 16, and an inner annular wall 58, which is attached to the lower end 32 (see FIG. 3) of the inner filter sleeve 18. The end cap 54 is also equipped with a center opening 60 defined by the inner annular wall 58 for communicating with the interior hollow 34 (see FIG. 1) of the filter element 14. An annular plate 62 extends between the outer and inner annular walls 56, 58 so as to be positioned at the lower end of the annular space 20 (see FIG. 3) of the filter element 14.

Figure 5:
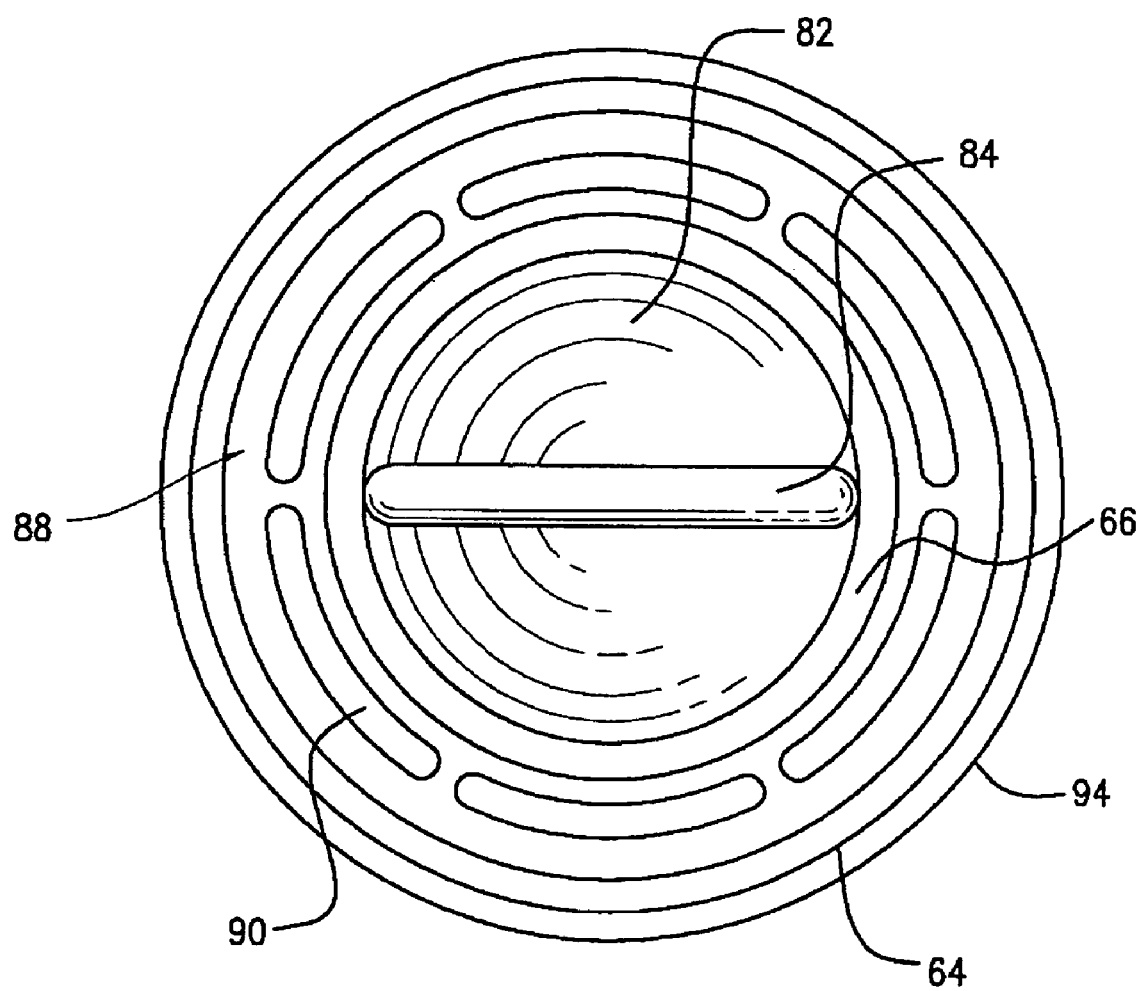
FIG. 5 is a bottom plan view of the filter assembly shown in FIGS. 1-3.

Referring now to FIGS. 1, 3, and 5, the restrainer basket 12 includes a cylindrical, elongated outer member 64 and a cylindrical, elongated inner member 66 which is positioned substantially concentrically relative to the outer member 64. As a result, an annular space 68 (see FIG. 1) is formed between the outer and inner members 64, 66. Each of the outer and inner members 64, 66 of the restrainer basket 12 is perforated with a plurality of holes 70 (see FIG. 3) for permitting passage of fluid therethrough. The outer and inner members 64, 66, each of which can be made from any suitable conventional rigid material such as stainless steel, have upper ends 72, 74, respectively, and lower ends 76, 78, respectively (see FIG. 3). The outer member 64 has a height greater than that of the inner member 66.

The inner member 66 defines an interior hollow 80 (see FIG. 1). A closed, non-perforated dome 82 is located at the upper end 74 of the inner member 66, thereby closing off an upper end of the interior hollow 80. The dome 82 is formed integrally with the inner member 66. As shown in FIG. 1, the dome 82 includes a groove 84, which is formed along a diameter of the upper end 74 of the inner member 66, and a hook 86, which is positioned across one portion of the groove 84 for purposes to be discussed hereinafter.

An annular end plate 88 (see FIGS. 1, 3, and 5) is also provided at the lower end of the restrainer basket 12. The end plate 88 extends between the outer and inner members 64, 66 of the restrainer basket 12 adjacent the lower ends 76, 78, respectively, thereof. With reference to FIG. 5, the end plate 88 includes a plurality of elongated, arcuate apertures 90, which facilitate the removal of debris that may accumulate around the lower end of the restrainer basket 12 by allowing fluid that passes through the apertures 90 to flush out the debris. The inner member 66 has an open bottom 92 (see FIG. 1) within its lower end 78.

Referring now to FIGS. 1-3 and 5, the filter assembly 10 also includes a sealing support collar 94 which has a construction and operation similar to those of the sealing collar disclosed in U.S. Pat. No. 5,075,004. For instance, the sealing collar 94, which has an opening 96 (see FIG. 1) therein, includes an annular lip portion 98 sized and shaped so as to be supported on the upper end 72 (see FIG. 3) of the outer member 64 of the restrainer basket 12. The lip portion 98 is adapted to provide a seal with the filter vessel V (see FIG. 3) in the manner described in U.S. Pat. No. 5,075,004. A cylindrically-shaped wall portion 100 depends from the lip portion 98 and is securely attached to the upper end 26 of the outer filter sleeve 16 in a conventional manner (e.g., by ultrasonic welding, adhesives and glues, laser bonding, "snap fit" or other attachment mechanisms known in the art). The sealing collar 94, which can be made from any suitable material, such as a plastic material (e.g., polypropylene or polyester), is provided with a pair of handles 102, 104 formed integrally therewith. Each of the handles 102, 104 extends across the opening 96 of the sealing collar 94 for use in mounting and/or removing the outer filter sleeve 16. The sealing collar 94 is positioned relative to the inner filter sleeve 18 such that the handles 102, 104 of the sealing collar 94 are adjacent to the handles 50, 52, respectively, of the inner filter sleeve 18.

Figure 6:
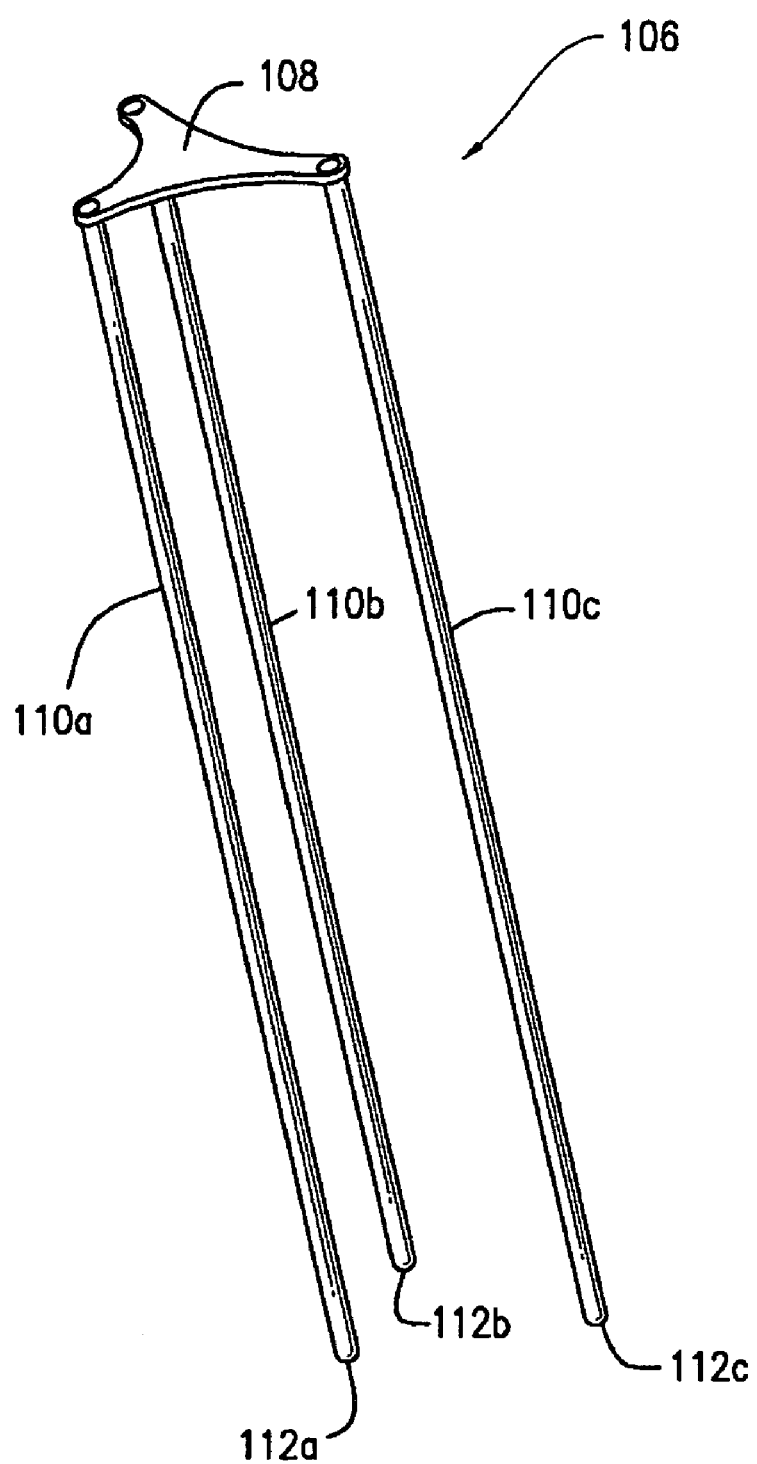
FIG. 6 is a perspective view of an insertion tool adapted for use with the filter assembly shown in FIGS. 1-3 and 5.

Referring now to FIG. 6, an insertion tool 106 can be provided to facilitate the insertion of the outer and inner filter sleeves 16, 18 (see FIGS. 1-3 and 5) of the filter element 14 into the restrainer basket 12 (see FIGS. 1, 3, and 5). The insertion tool 106 includes a Y-shaped member 108 and a plurality of longitudinally extending bars 110a-c which include ends 112a-c, respectively. In order to insert the outer and inner filter sleeves 16, 18 into the restrainer basket 12, the bars 110a-c are inserted into the annular space 20 (see FIGS. 1 and 3) formed between the outer and inner filter sleeves 16, 18. As the bars 110a-c are inserted further, the ends 112a-c of the bars 110a-c come in contact with the end cap 54 (see FIGS. 1 and 3) and cause the end cap 54 to move downwardly. Because the end cap 54 is connected to the outer and inner filter sleeves 12, 14, the outer and inner filter sleeves 12, 14 move conjointly with the end cap 54.

Figure 7:
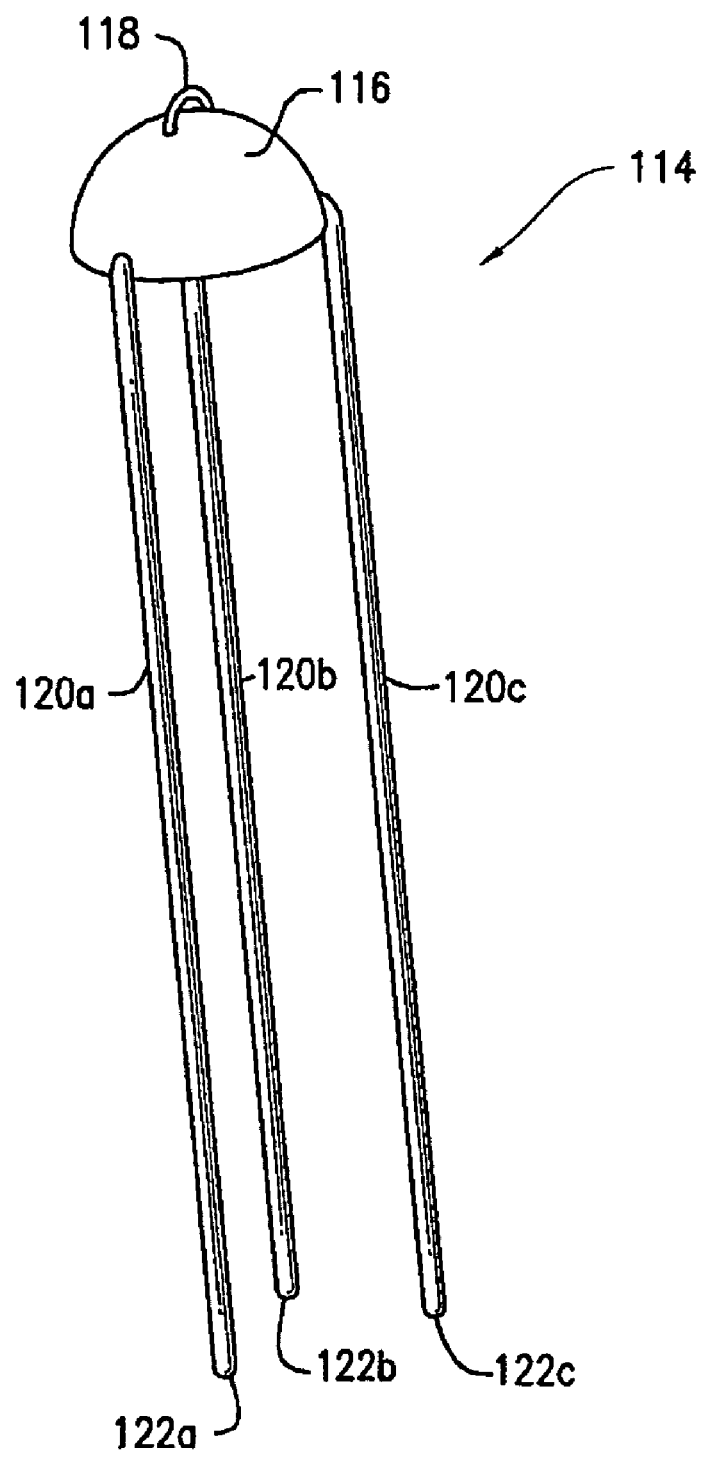
FIG. 7 is a perspective view of a protective device adapted for use with the filter assembly shown in FIGS. 1-3 and 5.

With reference to FIG. 7, a protective device 114 can be provided to replace the insertion tool 106 (see FIG. 6). The protective device 114 includes a dome-shaped body 116 with a hook 118. The protective device 114 also includes a plurality of longitudinally extending bars 120a-c which include ends 122a-c, respectively. The protective device 114 can be used to insert the outer and inner filter sleeves 16, 18 of the filter element 14 into the restrainer basket 12 in the same manner as the insertion tool 106. In addition, the protective device 114 can be used during filtration for reasons to be described hereinafter.

When positioned in the restrainer basket 12 with the use of the insertion tool 106 or the protective device 114, the outer and inner filter sleeves 16, 18 of the filter element 14 are positioned in the annular space 68 between the outer and inner members 64, 66 of the restrainer basket 12. As a result, the outer filter sleeve 16 is placed within the outer member 64 of the restrainer basket 12, while the inner filter sleeve 18 is positioned radially outwardly from the inner member 66 of the restrainer basket 12 (see FIG. 3). The upper end 28 of the inner filter sleeve 18 is supported on the closed, arcuate, upper end 74 of the inner member 66 of the restrainer basket 12. The end cap 54 of the filter element 14 is supported on the end plate 88 of the restrainer basket 12 (see FIG. 3), while the sealing collar 94 is supported on the upper end 72 of the outer member 64 of the restrainer basket 12. When the restrainer basket 12 and the filter element 14 are mounted in the filter vessel V, a space 124 (see FIG. 3) is formed between the outer member 64 of the restrainer basket 12 and the filter vessel V.

Figure 8:
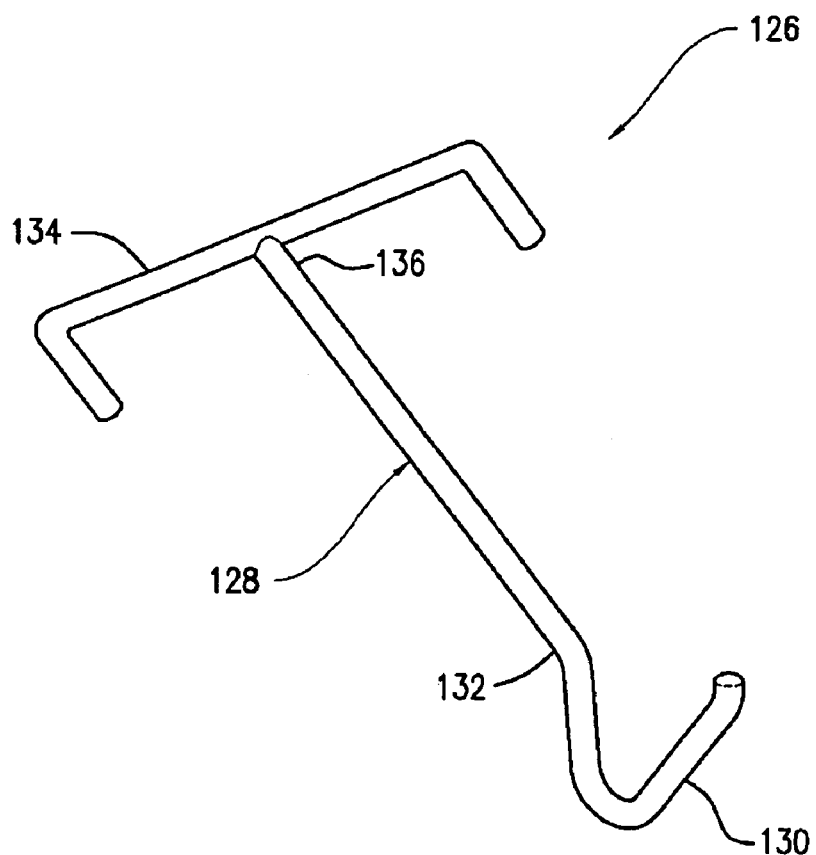
FIG. 8 is a perspective view of an extraction tool adapted for use with the filter assembly shown in FIGS. 1-3 and 5.

With reference to FIG. 8, an extraction tool 126 can be provided for removing the restrainer basket 12. The extraction tool 126 includes a rod 128, a hook portion 130 positioned on one end 132 thereof, and a C-shaped handle portion 134 positioned on an opposite end 136 thereof. More particularly, the opposite end 136 of the rod 128 is attached to the handle portion 134 adjacent a center thereof. The hook portion 130 is sized and shaped so as to engage the hook 86 of the dome 82 (see FIG. 1) of the inner member 66 of the restrainer basket 12. In this manner, the hook 86 of the restrainer basket 12 can function as a handle and can be used for removing the restrainer basket 12 from the filter vessel V (see FIG. 3).

In operation, fluid to be filtered is delivered into the filter vessel V through an inlet I (see FIG. 3). The fluid then flows into the annular space 20 of the filter element 14. A portion of the fluid flows outwardly from the annular space 20 of the filter element 14 into the space 124 of the filter vessel V through the filtering wall 22 of the outer filter sleeve 16 and the outer member 64 of the restrainer basket 12 (as indicated by arrow A in FIG. 3). The other portion of the fluid flows into the interior hollow 80 of the restrainer basket 12 through the filtering wall 24 of the inner filter sleeve 18 and the inner member 66 of the restrainer basket 12 (as indicated by arrow B in FIG. 3). After passing through the filter element 14 and the restrainer basket 12, the fluid is discharged from the filter vessel V through an outlet O (as indicated by arrow C in FIG. 3).

Figure 9:
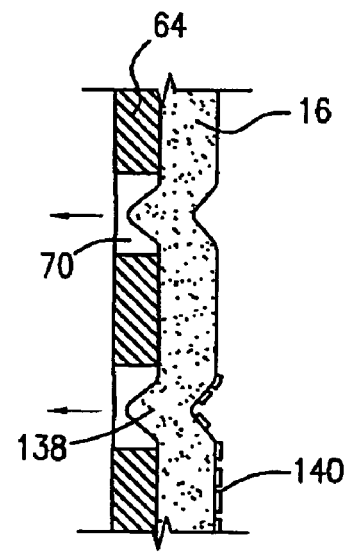
FIG. 9 is an enlarged schematic view showing how the filter sleeve of FIGS. 1-3 and 5 can become "stuck" to the restrainer basket of the same figures.

During the filtering process, the restrainer basket 12 functions to support the outer and inner filter sleeves 16, 18, which are pressed against the outer and inner members 64, 66, respectively, of the restrainer basket 12 due to the pressure of the fluid passing therethrough. More particularly, due to this pressure, portions of the inner filter sleeve 18 are pressed into the holes 70 of the inner member 66 of the restrainer basket 12, while portions 138 (see FIG. 9) of the outer filter sleeve 16 are pressed into the holes 70 of the outer member 64 of the restrainer basket 12. In such circumstances, the outer and inner filter sleeves 16, 18 often "stick" to the outer and inner members 64, 66, respectively, of the restrainer basket 12. Also, during the filtering process, debris 140 (see FIG. 9) often accumulates on the outer and inner filter sleeves 16, 18. As a result of these conditions, a relatively large lifting force is typically needed to simultaneously dislodge the outer and inner filter sleeves 16, 18 from the outer and inner members 64, 66, respectively, of the restrainer basket 12. As will be discussed hereinafter, the filter element 14 is adapted to facilitate its removal from the restrainer basket 12 by allowing the outer and inner filter sleeves 16, 18 to be sequentially dislodged from the outer and inner members 64, 66.

In order to remove the filter element 14 from the restrainer basket 12 and therefore the filter vessel V, the handles 102, 104 of the sealing collar 94 are gripped by a user's hand or hands and lifted upwardly. Because the handles 102, 104 are attached to the sealing collar 94 and the sealing collar 94 is secured to the outer filter sleeve 16, the sealing collar 94 and the outer filter sleeve 16 move upwardly conjointly with the handles 102, 104. Because the sealing collar 94 is not directly connected to the inner filter sleeve 18, the inner filter sleeve 18 remains substantially stationary during the initial upward movement of the sealing collar 94 and the outer filter sleeve 16.

After the sealing collar 94 and the outer filter sleeve 16 move upwardly an appropriate distance, the handles 50, 52 formed in the inner filter sleeve 18 can be gripped and lifted upwardly in order to move the inner filter sleeve 18 in an upward direction. Because the inner filter sleeve 18 is not directly connected to the outer filter sleeve 16 at their upper ends 26, 28, the outer filter sleeve 16 remains substantially stationary during the initial upward movement of the inner filter sleeve 18. The aforesaid steps may be repeated, as necessary, to sequentially release the outer and inner filter sleeves 16, 18 from the outer and inner members 64, 66, respectively, of the restrainer basket 12. Alternatively, the inner filter sleeve 18 could be moved before the outer filter sleeve 16. Accordingly, it will be understood that the outer and inner filter sleeves 16, 18 can be moved upwardly in any sequential order. The handles 50, 52 of the inner filter sleeve 18 can also be gripped and lifted upwardly by the user in order to lift the outer and inner filter sleeves 16, 18 simultaneously.

After the outer and inner filter sleeves 16, 18 are removed, the restrainer basket 12 can be removed from the filter vessel V with the use of the extraction tool 126. The hook portion 134 can be positioned so as to engage the hook 86 of the dome 82 of the inner member 66 of the restrainer basket 12. The extraction tool 126 can then be lifted upwardly. Because the hook portion 134 of the extraction tool 126 is engaged with the hook 86 of the restrainer basket 12, the restrainer basket 12 moves conjointly with the extraction tool 126.

It should be appreciated that the present invention provides numerous advantages over the prior art discussed above. Because the outer filter sleeve 16 and the inner filter sleeve 18 can be moved independently of each other, the outer and inner filter sleeves 16, 18 can be released sequentially from the outer and inner members 64, 66, respectively, of the restrainer basket 12. A person skilled in the art should appreciate that the force required to sequentially release the outer and inner filter sleeves 16, 18 is less than the force that would be required to simultaneously dislodge the outer and inner filter sleeves 16, 18 from the outer and inner members 64, 66 of the restrainer basket 12.

In addition, the groove 84 (see FIG. 1) formed in the dome 82 prevents the accumulation of debris around the top of the dome 82 by allowing fluid to flow from the center of the groove 84 toward the ends thereof. When the protective device 114 (see FIG. 7) is used during filtration, the bars 120a-c are positioned in the annular space 20 and the dome-shaped body 116 is placed over the dome 82 of the inner member 66. In this manner, the dome-shaped body 116 serves to deflect abrasive fluids, thereby preventing such fluids from contacting the dome 82 of the inner member 66. Also, because the protective device 114 can be used during filtration, the risk of misplacing the protective device 114 is reduced.

Because the outer and inner sleeves 16, 18 are not attached to a cap (not shown) at their upper ends 26, 28, respectively, it is not necessary to align the bars 110a-c of the insertion tool 106 (see FIG. 6) or the bars 120a-c of the protective device 114 (see FIG. 7) with the openings (not shown) formed in the cap. Also, because the outer and inner filter sleeves 16, 18 are not attached to a cap (not shown) at their upper ends 26, 28, respectively, fluid to be filtered can freely flow into the annular space 20 of the filter element 14 without having to pass through the openings (not shown) formed in the cap. Thus, fluid flow is not limited by the dimensions of the openings formed in the cap and pressure losses are lower compared to those experienced by conventional fluid filters employing such a cap.

Although the restrainer basket 12 is manufactured in specific dimensions with a given tolerance, the inner member 66 of the restrainer basket 12 may become misaligned (e.g., positioned off-center) during, for instance, transport or maintenance. Because the outer and inner members 64, 66 of the restrainer basket 12 are not attached to a common cap (not shown) at their upper ends 72, 74, respectively, it is not necessary to realign the inner member 66 with the cap. Thus, slight misalignment of the inner member 66 can be tolerated.

Figure 10:
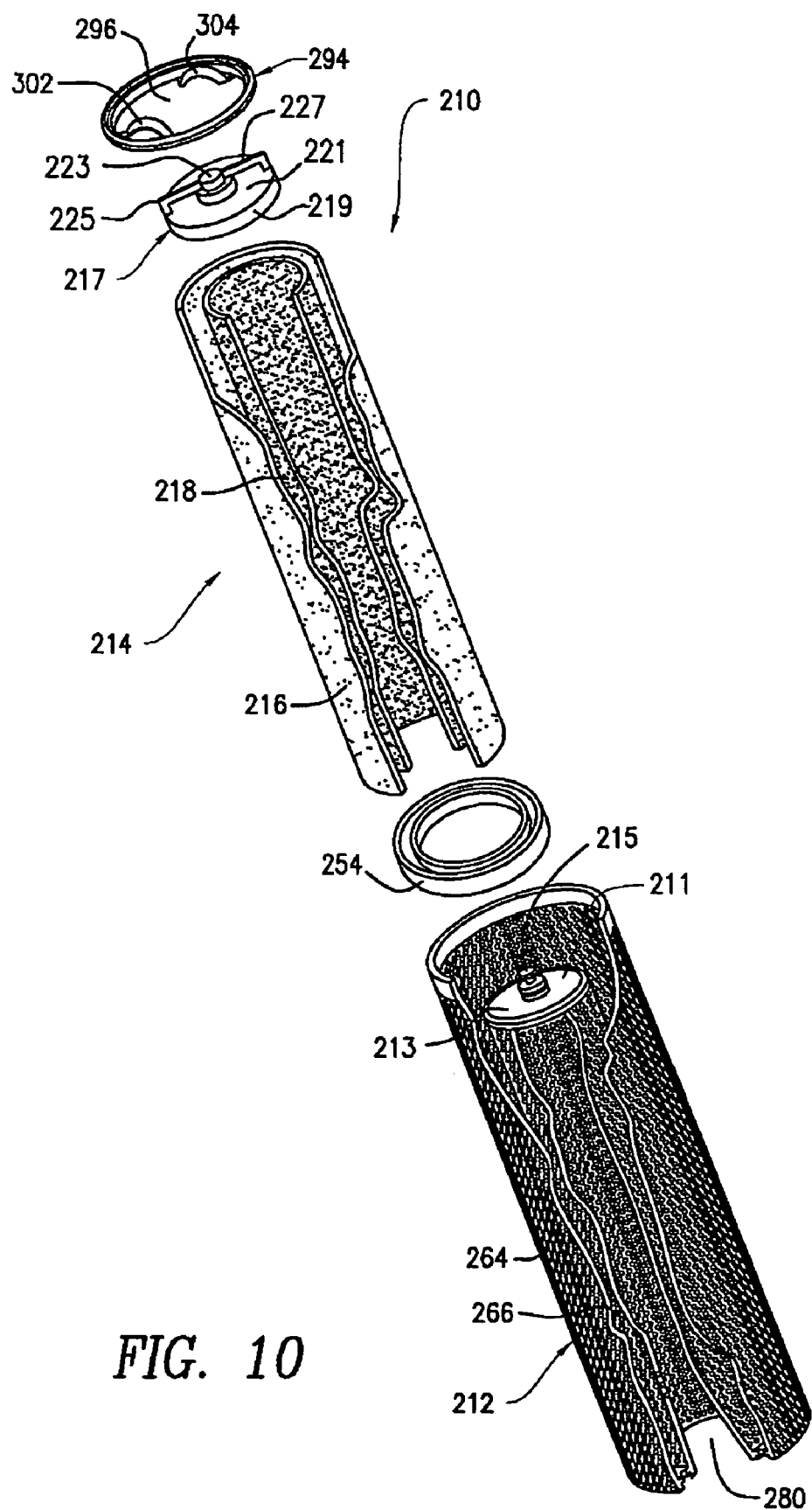
FIG. 10 is an exploded perspective view of a filter assembly including a porous filter sleeve and a perforated basket, both of which are constructed in accordance with a second exemplary embodiment of the present invention. Portions of the filter sleeve and the restrainer basket have been broken away to facilitate consideration and discussion.
Figure 11:
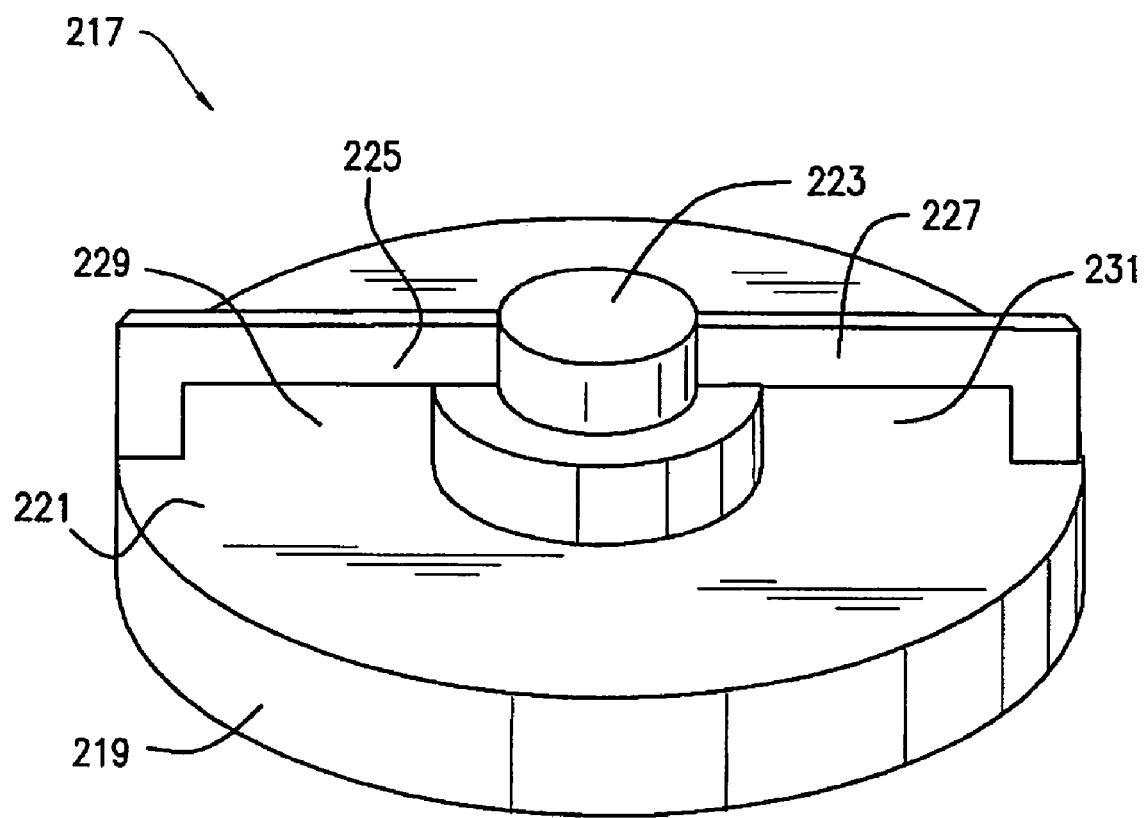
FIG. 11 is a perspective view of a support cap utilized in the filter sleeve shown in FIG. 10.
Figure 12:
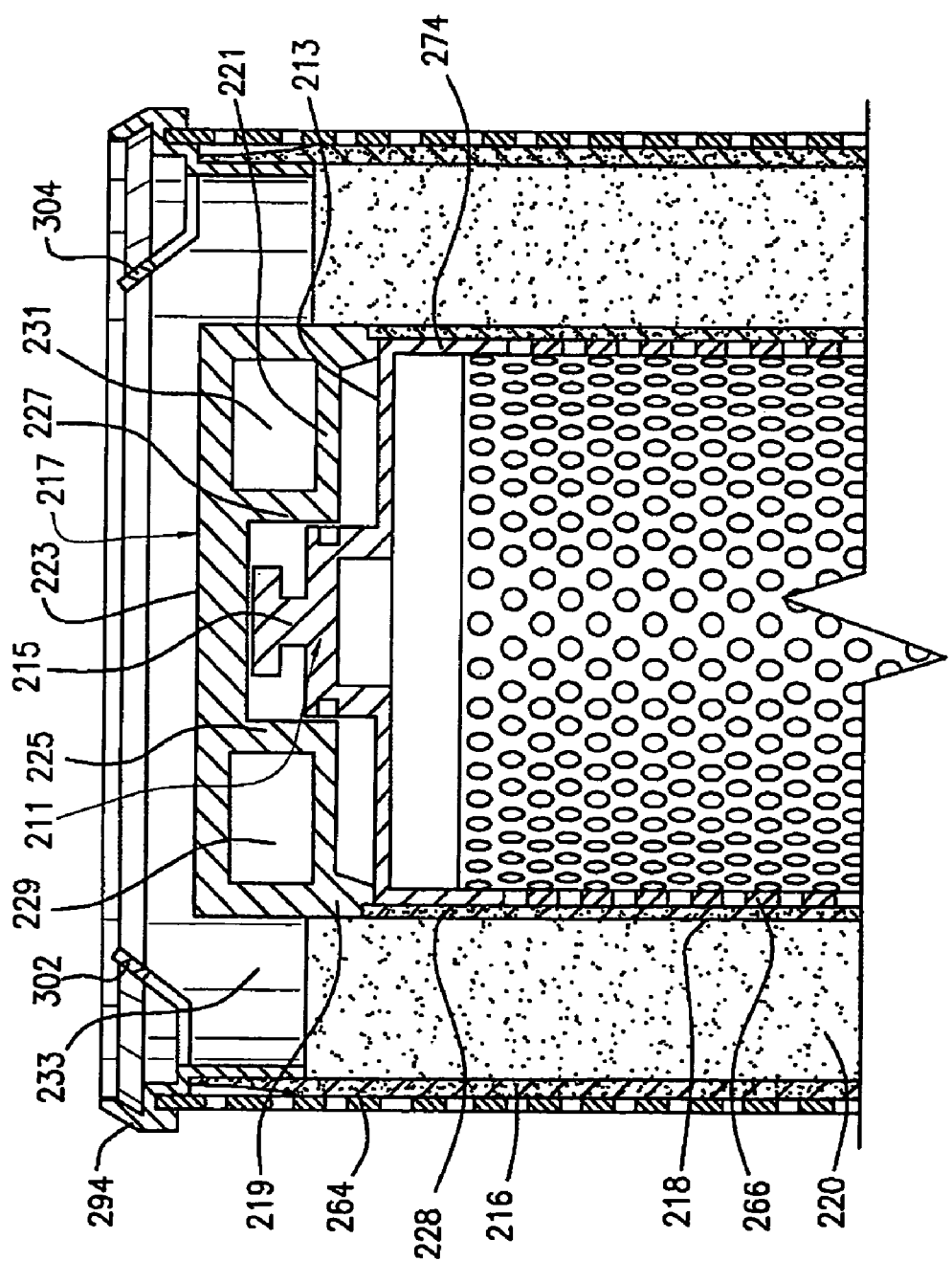
FIG. 12 is a partial cross-sectional view similar to the view shown in FIG. 3, illustrating an upper portion of the filter assembly shown in FIG. 10.

A second exemplary embodiment of the present invention is illustrated in FIGS. 10-12. Elements illustrated in FIGS. 10-12 which correspond substantially to the elements described above with reference to FIGS. 1-9 have been designated by corresponding reference numerals increased by two hundred. In addition, elements illustrated in FIGS. 10-12 which do not correspond substantially to the elements described above with reference to FIGS. 1-9 have been designated by odd numbered reference numerals starting with reference number 211. The embodiment of the present invention shown in FIGS. 10-12 operates and is constructed in manners consistent with the foregoing description of the filter assembly 10 shown in FIGS. 1-9, unless it is stated otherwise.

FIGS. 10 and 12 illustrate a filter assembly 210 equipped with a restrainer basket 212 and a filter element 214 sized and shaped so as to be received in the restrainer basket 212. The filter element 214 includes an outer filter sleeve 216 and an inner filter sleeve 218. Like the first embodiment, an end cap 254 is secured to the outer and inner filter sleeves 216, 218.

The restrainer basket 212 has outer and inner members 264, 266. The restrainer basket 212 includes a crown member 211 attached to an upper end 274 (see FIG. 12) of the inner member 266 to thereby close off an upper end of an interior hollow 280 (see FIG. 10) formed within the inner member 266. More particularly, the crown member 211 is provided with a flange member 213, which is fixedly or removably attached to the upper end 274 of the inner member 266, and a protrusion 215, which extends upwardly from the flange member 213. The restrainer basket 212 is similar to the restrainer basket disclosed in U.S. patent application Ser. No. 10/335,582, which was published as U.S. Patent Publication No. US-2004-0124129-A1, the disclosure of which is incorporated herein by reference in its entirety.

With reference to FIGS. 10-12, the filter assembly 210 is equipped with an inner cap 217 attached to an inner filter sleeve 218 (see FIGS. 10 and 12). More particularly, the inner cap 217 includes a skirt 219 attached to the upper end 228 (see FIG. 12) of the inner filter sleeve 218 in a conventional manner (e.g., ultrasonic welding). The inner cap 217 has a circular, generally planar top wall 221. A circular dome 223 extends from the center of the top wall 221 and is sized and shaped so as to receive the protrusion 215 of the crown member 211 of the restrainer basket 212. Vertical ribs 225, 227 protrude from the circular dome 223 and extend upwardly from the top wall 221. More particularly, the vertical ribs 225, 227 extend to opposing sides of the skirt 219 of the inner cap 217. The vertical ribs 225, 227 have holes 229, 231, respectively, formed therein, whereby a user can insert their fingers therethrough for use in mounting and/or removing the inner filter sleeve 218 in and from the restrainer basket 212. Alternatively, a separate handle (not shown) can be inserted through the holes 229, 231 of the vertical ribs 225, 227.

As shown in FIGS. 10 and 12, the filter assembly 210 has a sealing collar 294, which has handles 302, 304. The sealing collar 294 is a component separate and independent from the inner cap 217. The sealing collar 294 has a diameter greater than that of the inner cap 217, which is positioned in an opening 296 (see FIG. 10) of the sealing collar 294. A generally annular opening 233 (see FIG. 12) is formed between the sealing collar 294 and the inner cap 217 and is in communication with an annular space 220 formed between the outer and inner filter sleeves 216, 218.

A third exemplary embodiment of the present invention is illustrated in FIGS. 13-16. Elements illustrated in FIGS. 13-16 which correspond to the elements described above with reference to FIGS. 1-9 have been designated by corresponding even numbered reference numerals increased by three hundred. In addition, elements illustrated in FIGS. 13-16 which do not correspond to the elements described above with reference to FIGS. 1-9 have been designated by odd numbered reference numerals starting with reference number 311. The embodiment of FIGS. 13-16 operates in the same manner as the embodiments of FIGS. 1-12, unless it is otherwise stated.

Figure 13:
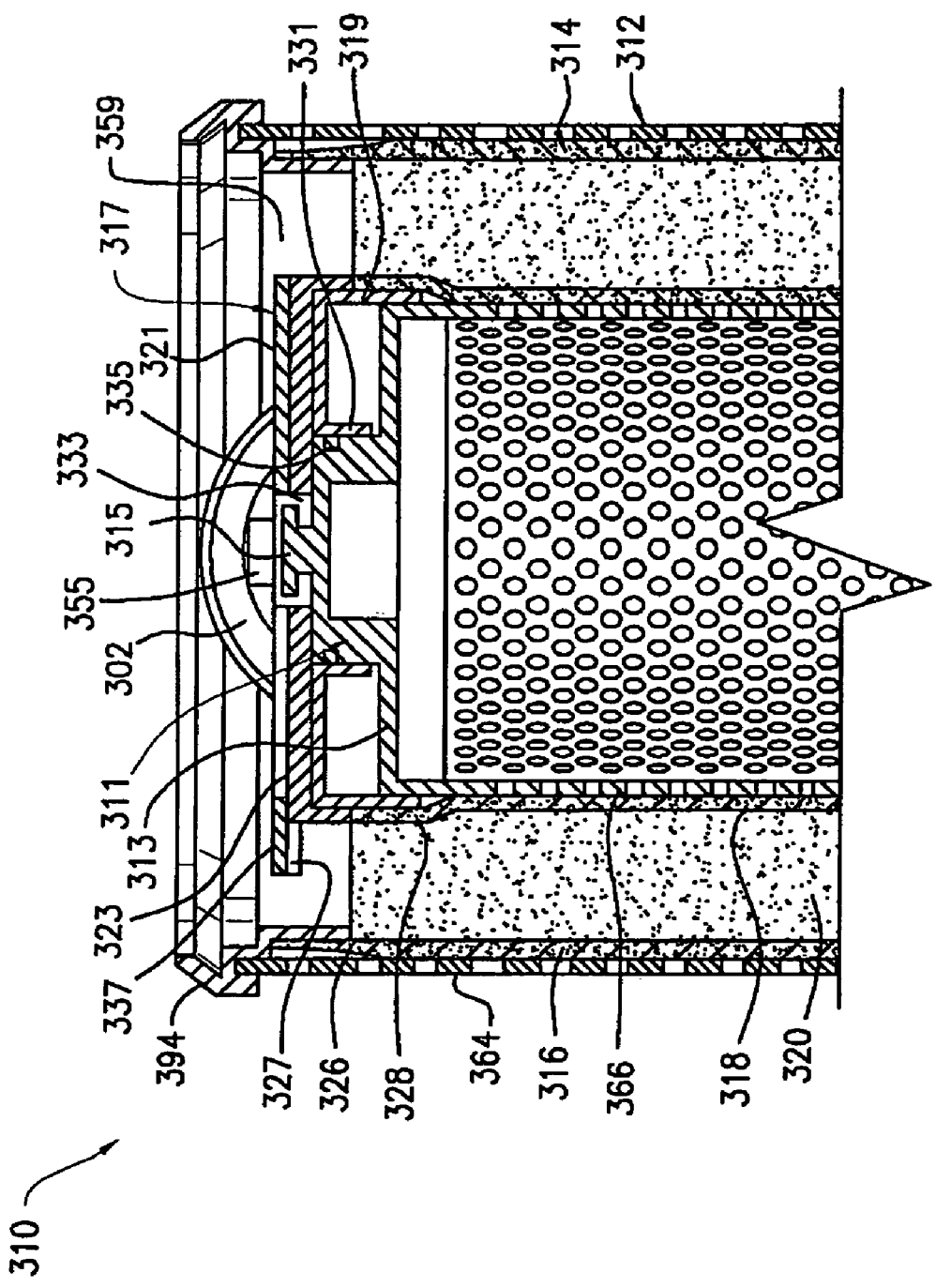
FIG. 13 is a partial cross-sectional view similar to the view shown in FIG. 3, illustrating an upper portion of a filter assembly constructed in accordance with a third exemplary embodiment of the present invention.
Figure 15A:
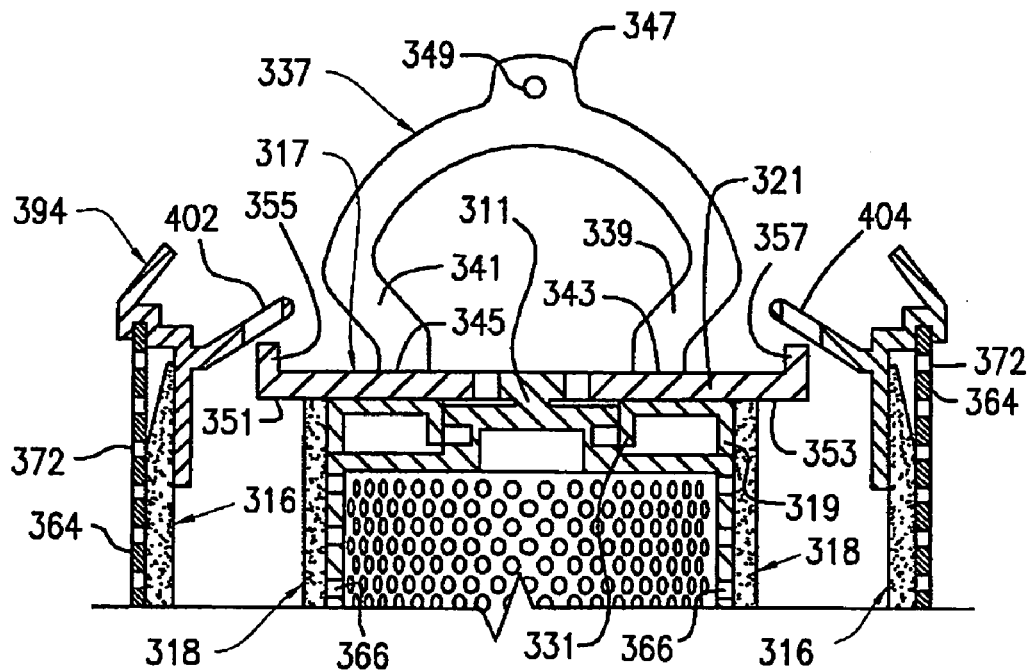
FIGS. 15A and 15B are sequential, partial cross-sectional views, showing how the ring of FIG. 14 engages a sealing collar during the removal of a filter sleeve.
Figure 15B:
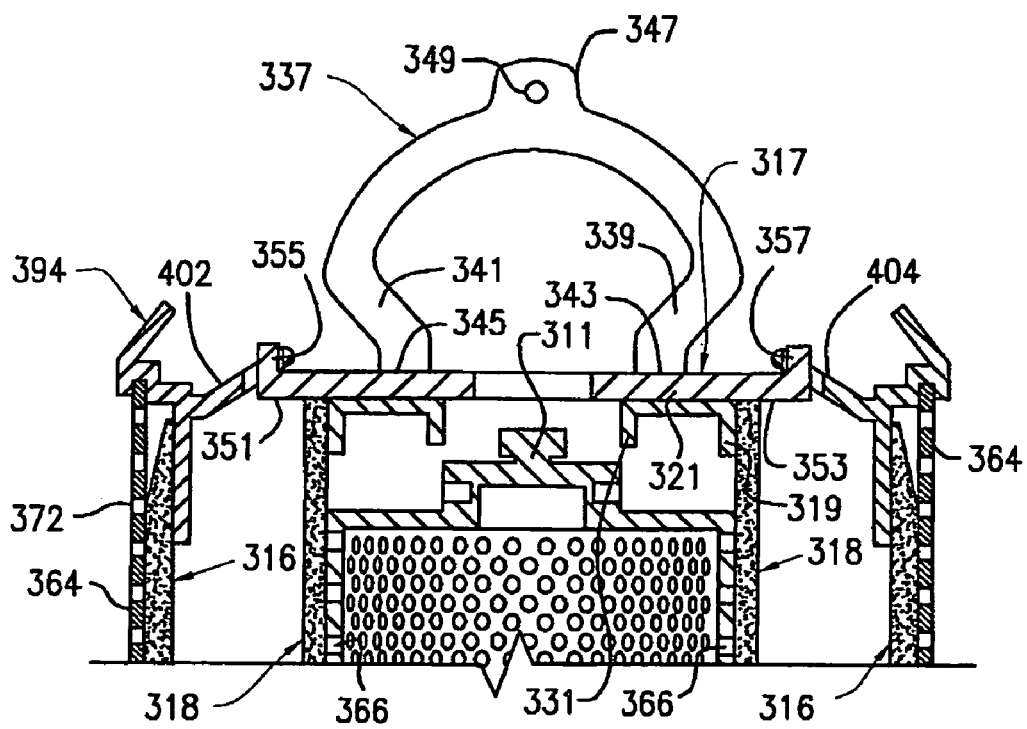

With reference to FIGS. 13, 15A, and 15B, a filter assembly 310 is equipped with a restrainer basket 312 and a filter element 314 sized and shaped so as to be received in the restrainer basket 312. The filter element 314 includes an outer filter sleeve 316 and an inner filter sleeve 318.

The restrainer basket 312 has outer and inner members 364, 366. The restrainer basket 312 is identical to the restrainer basket 212, and includes a crown member 311, a flange member 313, and a protrusion 315, which extends upwardly from the flange member 313.

With reference to FIGS. 13-15B, the filter assembly 310 is equipped with an inner ring 317 attached to an inner filter sleeve 318 (see FIGS. 13 and 15). More particularly, the inner ring 317 includes a skirt 319 attached to an upper end 328 of the inner filter sleeve 318 (see FIGS. 13 and 15) in a conventional manner (e.g., ultrasonic welding). The inner ring 317 has a circular, generally planar top wall 321 having a groove or depression 323 therein for purposes to be discussed hereinafter. Protrusions 325, 327, which are formed monolithically with the inner ring 317, project from the skirt 319 outwardly in a generally radial direction. The protrusions 325, 327 are spaced apart to define a generally U-shaped aperture 329 therebetween (see FIG. 14).

A cylindrically-shaped internal wall 331 projects downwardly from the top wall 321. More particularly, the internal wall 331 is positioned substantially concentric relative to the skirt 319. A circular opening 333 is formed in the top wall 321 and is defined by the internal wall 331. The opening 333 is sized and shaped so as to receive the protrusion 315 of the crown member 311 of the restrainer basket 312 such that the opening 333 can be sealed off by the protrusion 315. A sealing member 335, such as an O-ring, is provided such that it can be placed between the internal wall 331 of the inner ring 317 and the protrusion 315 of the restrainer basket 312 so as to form a substantially fluid-tight seal between the inner ring 317 and the crown member 311, thereby preventing non-filtered fluid from entering the interior hollow (not shown) defined by the inner member 366 of the restrainer basket 312. Alternatively, the inner ring 317 may include other conventional sealing mechanisms. The opening 333 may also be utilized for mounting additional filtering components, such as a filter cartridge (not shown). An example of a suitable filter cartridge is disclosed in U.S. Pat. No. 6,007,718, the disclosure of which is incorporated herein by reference in its entirety.

Figure 14:
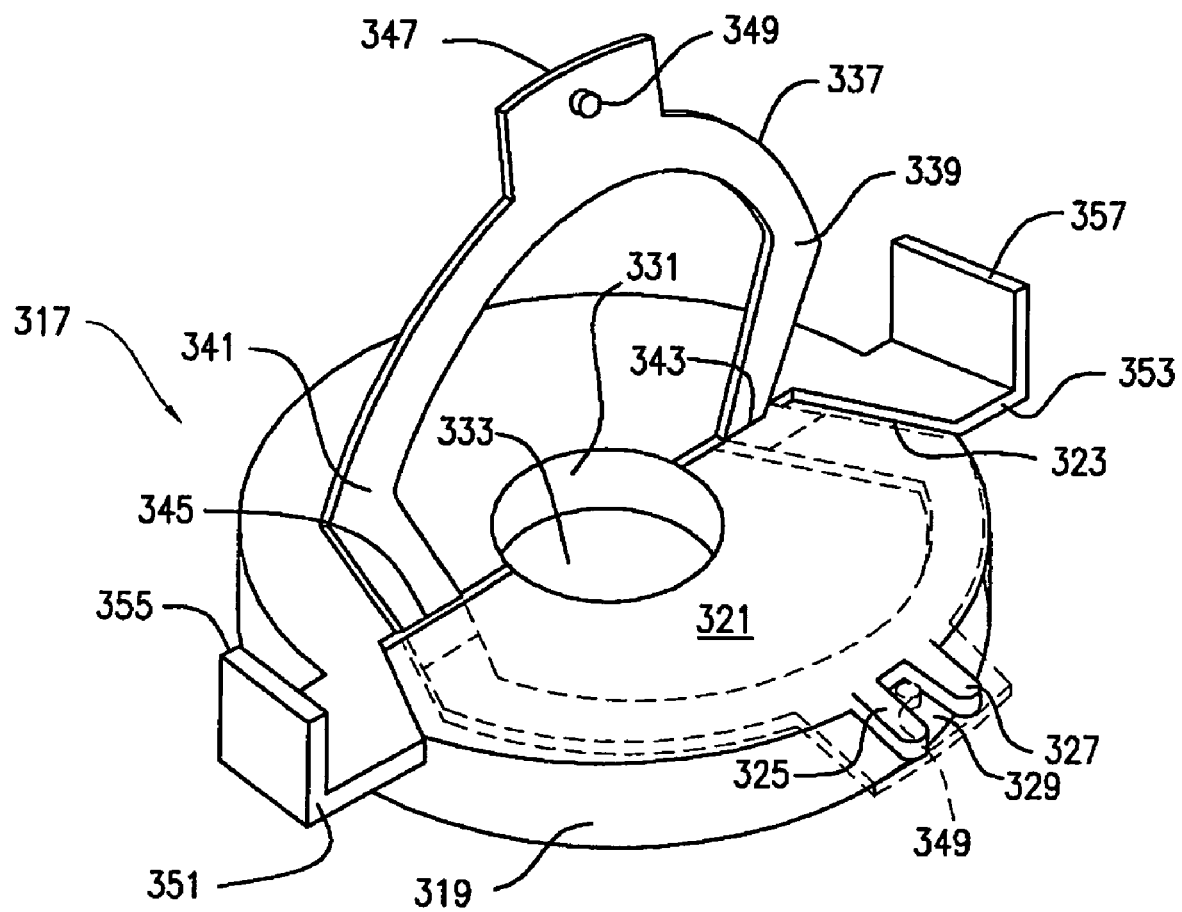
FIG. 14 is a perspective view of a ring of the filter assembly shown in FIG. 13.

With reference to FIGS. 14, 15A, and 15B, the inner ring 317 is provided with a foldable handle 337 which includes a pair of ends 339, 341. Living hinges 343, 345 are provided for pivotally connecting the ends 339, 341 of the handle 337 to the top wall 321 of the inner ring 317 such that the handle 337 is pivotable between a folded or retracted position, in which it is laid substantially flat against the top wall 321 and is thereby received in the depression 323 (as indicated by the broken line presentation of the handle 337 in FIG. 14), and an unfolded or extended position, in which it projects upwardly from the top wall 321 (as indicated by the solid line representation of the handle 337 in FIG. 14). A tab 347 projects from the handle 337 and includes a peg 349 protruding therefrom. The peg 349 is shaped and sized such that it can be inserted into the U-shaped aperture 329 and releasably gripped or retained by the protrusions 325, 327 so as to maintain the handle 337 in its retracted/folded position.

With reference to FIG. 14, the inner ring 317 is also equipped with flanges 351, 353 formed integrally therewith. More particularly, the flanges 351, 353 protrude radially outwardly from opposing sides of the skirt 319 of the inner ring 317 such that they are diametrically opposed relative to one another. Vertical members or lobes 355, 357 extend generally upwardly from the flanges 351, 353, respectively, for purposes to be discussed hereinafter.

As shown in FIGS. 13, 15A, and 15B, the filter assembly 310 includes a sealing collar 394 which is a component separate and independent from the inner ring 317. The sealing collar 394 has a diameter greater than that of the inner ring 317, which is positioned in an opening (not shown) of the sealing collar 394. A generally annular channel 359 (see FIG. 13) is formed between the sealing collar 394 and the inner ring 317 and communicates with an annular space 320 of the filter element 314. The sealing collar 394 is positioned relative to the inner ring 317 such that handles 402, 404 (see FIGS. 15A and 15B) of the sealing collar 394 are aligned vertically with the flanges 351, 353, respectively, of the inner ring 317 (i.e., the handles 402, 404 is positioned directly above the flanges 351, 353, respectively). Under a normal condition, the flanges 351, 353 of the inner ring 317 are spaced, and hence disengaged, from the handles 402, 404, respectively, of the sealing collar 394. When the inner ring 317 is lifted vertically, the flanges 351, 353 come in engagement with the handles 402, 404, respectively, which extend across the opening of the sealing collar 394, for purposes to be discussed hereinafter.

Figure 16:
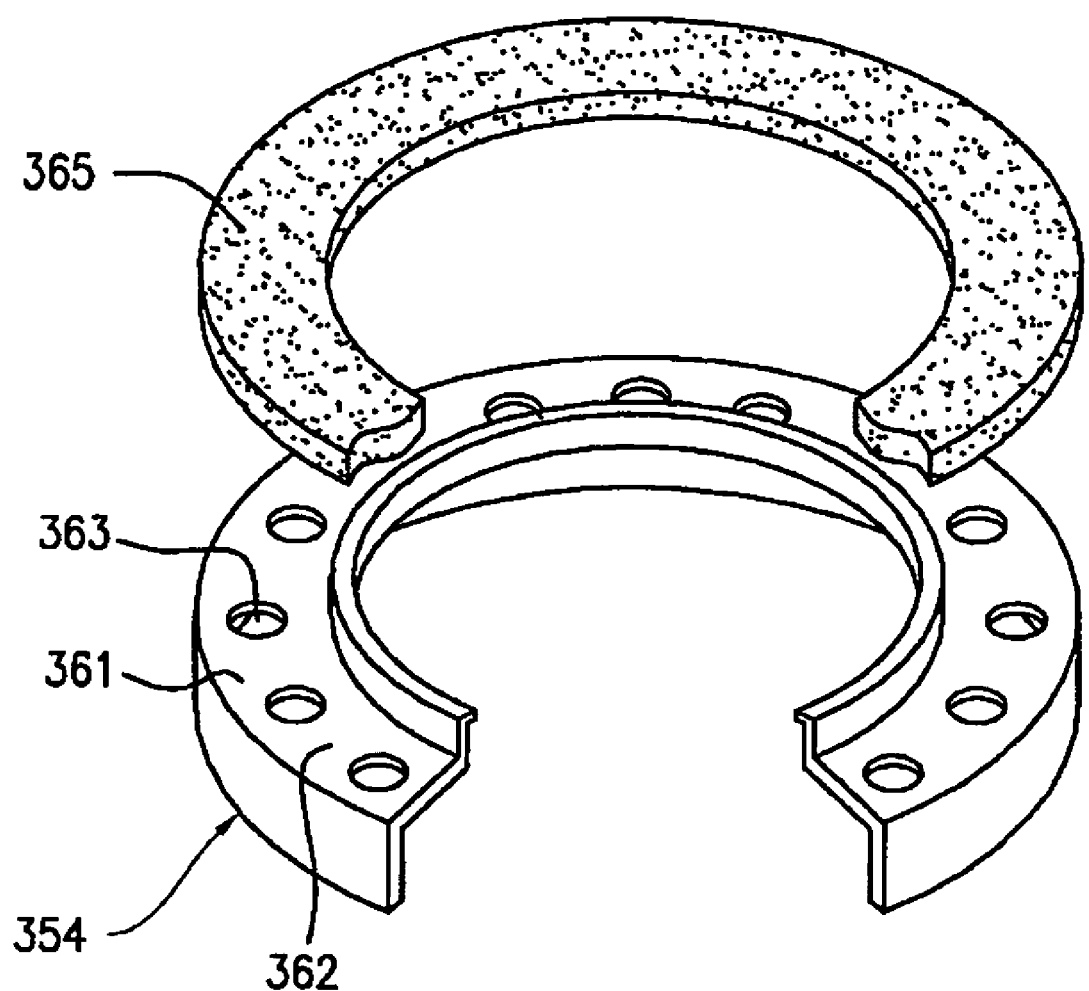
FIG. 16 is a perspective view of an end cap of the filter assembly shown in FIG. 13. Portions of the end cap have been broken away to facilitate consideration and discussion.

Referring now to FIG. 16, an end cap 354 includes an upper surface 361 facing the annular space 320 (see FIG. 13) and equipped with a plurality of holes 363 arranged along the circumference of the end cap 354. A ring-shaped lining 365 is overlaid on the upper surface 361 so as to cover the holes 363 provided in the upper surface 361. More particularly, the lining 365 corresponds, in size and shape to the upper surface 361 and is secured to the upper surface 361 by way of a conventional attaching mechanism (e.g., ultrasonic welding, conventional adhesives and glues, laser bonding, "snap fit" or other mechanical attachment mechanisms known in the art). The lining 365 is made from suitable filtering media (e.g., polypropylene, polyester, etc.) such that fluid can pass through the holes 363 formed in the end cap 354 after being filtered by the lining 365. In this manner, the fluid that passes through the lining 365 and the holes 363 can flush out debris accumulated on the end cap 354.

As indicated above, the filter element 314 is removably mounted in and supported by the restrainer basket 312 (see FIG. 13). In order to facilitate mounting of the filter element 314 in the restrainer basket 312, the handle 337 of the inner ring 317 can be placed in its unfolded/extended position and be gripped by a user's hand. Similarly, one or both handles 402, 404 of the sealing collar 394 can also be gripped by a user. Once the filter element 314 is properly mounted in the restrainer basket 312, the handle 337 is pivoted to its folded/retracted position so as not to interference with flow of fluid into the filter element 314. The handle 337 is maintained in its folded/retracted position by the engagement between the peg 349 and the protrusions 325, 327.

In order to remove the filter element 314 from the restrainer basket 312, the handle 337 of the inner ring 317 is pivoted from its folded/retracted position to its unfolded/extended position (see FIG. 15A). With the handle 337 gripped by a user's hand or hands, the handle 337 is lifted upwardly. Because the handle 337 is attached to the inner ring 317 and the inner ring 317 is secured to the inner filter sleeve 318, the inner ring 317 and the inner filter sleeve 318 move upwardly conjointly with the handle 337, dislodging the inner ring 317 from the crown member 311. Because the inner ring 317 is not directly connected to the sealing collar 394 and hence the outer filter sleeve 316, the sealing collar 394 and the outer filter sleeve 316 remain substantially stationary during the initial upward movement of the inner ring 317 and the inner filter sleeve 318. As the handle 337 of the inner ring 317 is lifted further, the flanges 351, 353 of the inner ring 317 come in contact with the handles 402, 404, respectively, of the sealing collar 394 and cause the supporting collar 394 and the outer filter sleeve 316 to move upwardly conjointly therewith (see FIG. 15B). Once the handles 402, 404 of the sealing collar 394 are engaged by the flanges 351, 353, respectively, of the inner ring 317, the entire filter element 314 can be removed from the restrainer basket 312 by pulling the handle 337 of the inner ring 317 upwardly. The lobes 355, 357 of the flanges 351, 353, respectively, are provided to ensure secure engagement between the flanges 351, 353 and the handles 402, 404, respectively, during the removal of the filter element 314 from the restrainer basket 312.

An advantage of the handle 337 of the inner ring 317 is its pivoting motion, which allows it to be folded down into the depression 323 (see FIG. 14), so as not to interfere with the liquid filtration process. Insertion of the peg 349 on the tab 347 into the aperture 329 secures the handle 337 in its folded/retracted position during filtration to prevent possible interference.

It should be noted that the present invention can have numerous modifications and variations. For instance, the vertical orientation of the filter assemblies 10, 210 and 310 (see FIGS. 2, 10, and 13, respectively) illustrated and described herein is merely exemplary, and the filter assemblies 10, 210 and 310 can hence have other orientations (e.g., a horizontal orientation, an upside-down orientation, etc.). The outer filter sleeve 16 and the inner filter sleeve 18 may be collapsible. Also, the outer filter sleeve 16 and the inner filter sleeve 18 may have a common closed end (not shown), thereby eliminating the need for the end cap 54. The outer and inner filter sleeves 16, 18 can be multi-layered. Further, the end plate 88 of the restrainer basket 12 can be solid or perforated. Although two handles 102, 104 are shown for the sealing collar 94, the number can vary. Moreover, when additional filtering components (e.g., a filter cartridge) are to be mounted in the filter assembly 310, the crown member 311 of the restrainer basket 312 can be eliminated.

It will be understood that the embodiments described herein are merely exemplary, and that a person skilled in the art may make many variations and modifications without departing from the spirit and scope of the invention. All such variations and modifications, including those discussed above, are intended to be included within the scope of the invention as defined by the appended claims.

What is claimed is:

1. A filter element, comprising an outer sleeve made from a flexible, pervious material and having an open upper end and a lower end; an inner sleeve arranged substantially concentric with respect to said outer sleeve and having a closed upper end and a lower end, said inner sleeve being made from a flexible, pervious material, said upper end of said inner sleeve being detached from said upper end of said outer sleeve; attaching means for attaching said lower end of said inner sleeve to said lower end of said outer sleeve; and removal means for facilitating the removal of said filter element from an associated filter housing, said removal means including at least one handle attached to said inner sleeve but not attached to said outer sleeve, and at least one handle attached to said outer sleeve but not attached to said inner sleeve.

2. The filter element of claim 1, wherein said at least one inner sleeve handle includes a first handle and a second handle, said first and second handles being attached to said upper end of said inner sleeve.

3. The filter element of claim 2, wherein each of said first handle and said second handle is made from the same flexible, pervious material as said inner sleeve.

4. The filter element of claim 3, wherein said removal means further includes a third handle and a fourth handle, said third and fourth handles being connected to said upper end of said outer sleeve.

5. The filter element of claim 4, further comprising a collar connected to said upper end of said outer sleeve, said third and fourth handles being attached to said collar.

6. The filter element of claim 5, wherein said first and second handles are attached to said inner sleeve such that said inner sleeve can be moved by said first and second handles substantially independent of said outer sleeve.

7. The filter element of claim 1, wherein said attaching means includes an end cap connected between said lower end of said inner sleeve and said lower end of said outer sleeve.

8. The filter element of claim 7, wherein said inner sleeve is mounted within said outer sleeve so as to form a space between said inner and outer sleeves, said end cap including at least one opening in communication with said space and a lining made of a pervious material and positioned over said at least one opening.

9. The filter element of claim 1, further comprising a cap attached to said upper end of said inner sleeve, said at least one inner sleeve handle being attached to said cap.

10. The filter element of claim 9, wherein said at least one inner sleeve handle includes a first handle and a second handle, said first and second handles being mounted to said cap.

11. The filter element of claim 10, wherein said cap includes a top wall and a center portion extending upwardly from said top wall.

12. The filter element of claim 11, wherein each of said first handle and said second handle protrudes radially outwardly from said center portion and has an end attached to said top wall.

13. The filter element of claim 12, wherein said first handle and said second handle protrude radially outwardly from said center portion in opposite directions.

14. The filter element of claim 13, wherein said cap has a skirt depending from said top wall and attached to said upper end of said inner sleeve.

15. A filter element, comprising an outer sleeve made from a flexible, pervious material and having an open upper end and a lower end; an inner sleeve arranged substantially concentric with respect to said outer sleeve and having a closed upper end and a lower end, said inner sleeve being made from a flexible, pervious material, said upper end of said inner sleeve being detached from said upper end of said outer sleeve; attaching means for attaching said lower end of said inner sleeve to said lower end of said outer sleeve; removal means for facilitating the removal of said filter element from an associated filter housing, said removal means including at least one handle; and a cap having a substantially planar wall and at least one flange extending outwardly therefrom, said cap being attached to said upper end of said inner sleeve and to said at least one handle, and wherein said at least one handle is sized and shaped so as to move between a retracted position, in which said at least one handle is positioned substantially flat against said wall, and an extended position, in which said at least one handle projects upwardly from said wall.

16. The filter element of claim 15, wherein said removal means includes another handle attached to said upper end of said outer sleeve, said at least one flange being engageable with said another handle when said at least one handle is pulled upwardly to remove said filter element from an associated filter housing.

17. The filter element of claim 1, wherein said outer sleeve and said inner sleeve are movable independent of each other.

18. A filter assembly, comprising a filter element including an outer sleeve and an inner sleeve, said outer sleeve being made from a flexible, pervious material and having an open upper end and a lower end, said inner sleeve being arranged substantially concentric with respect to said outer sleeve and having a closed upper end and a lower end, said inner sleeve being made from a flexible, pervious material, said upper end of said inner sleeve being detached from said upper end of said outer sleeve, said filter element including attaching means for attaching said lower end of said inner sleeve to said lower end of said outer sleeve and removal means for facilitating the removal of said filter element from an associated filter housing, said removal means including at least one handle attached to said inner sleeve but not attached to said outer sleeve, and at least one handle attached to said outer sleeve but not attached to said inner sleeve; and supporting means for supporting said filter element in a filter housing.

19. The filter assembly of claim 18, wherein said supporting means includes a basket having an outer member, which is sized and shaped so as to support said outer sleeve of said filter element, and an inner member, which is arranged concentric with respect to said outer member and is sized and shaped so as to support said inner sleeve of said filter element.

20. The filter assembly of claim 19, wherein said basket includes a dome having an outer portion attached to said inner member, a groove extending across said dome, and another handle positioned across said groove so as to facilitate removal of said basket from an associated filter housing.

* * * * *